US012779893B2

(12) United States Patent
Nishimura et al.

(10) Patent No.: US 12,779,893 B2
(45) Date of Patent: Nov. 3, 2026

(54) THERMAL RECORDING MATERIAL

(71) Applicant: MITSUBISHI PAPER MILLS LIMITED, Tokyo (JP)

(72) Inventors: Naoya Nishimura, Tokyo (JP); Ryota Yoshida, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 257 days.

(21) Appl. No.: 18/577,089

(22) PCT Filed: Jun. 17, 2022

(86) PCT No.: PCT/JP2022/024282

§ 371 (c)(1),
(2) Date: Jan. 5, 2024

(87) PCT Pub. No.: WO2023/002786

PCT Pub. Date: Jan. 26, 2023

(65) Prior Publication Data

US 2024/0294025 A1 Sep. 5, 2024

(30) Foreign Application Priority Data

Jul. 19, 2021 (JP) ................................ 2021-118414
Oct. 26, 2021 (JP) ................................ 2021-174574
Oct. 26, 2021 (JP) ................................ 2021-174575

(51) Int. Cl.

| | |
|---|---|
| ***B41M 5/46*** | (2006.01) |
| ***B41M 5/32*** | (2006.01) |
| ***B41M 5/333*** | (2006.01) |
| ***B41M 5/41*** | (2006.01) |
| ***B41M 5/42*** | (2006.01) |
| ***B41M 5/44*** | (2006.01) |
| ***G03C 1/498*** | (2006.01) |

(52) U.S. Cl.

CPC .............. *B41M 5/465* (2013.01); *B41M 5/32* (2013.01); *B41M 5/3335* (2013.01); *B41M 5/41* (2013.01); *B41M 5/42* (2013.01); *B41M 5/44* (2013.01); *G03C 1/49854* (2013.01); *B41M 2205/04* (2013.01); *B41M 2205/38* (2013.01); *B41M 2205/40* (2013.01)

(58) Field of Classification Search

CPC ........ B41M 5/32; B41M 5/3335; B41M 5/41; B41M 5/42; B41M 5/44; B41M 5/46; B41M 5/465; B41M 2205/04; B41M 2205/38; B41M 2205/40; G03C 1/49809; G03C 1/49854; G03C 1/49872

See application file for complete search history.

(56) References Cited

U.S. PATENT DOCUMENTS

| | | | |
|---|---|---|---|
| 5,766,828 | A | 6/1998 | Patel |
| 5,863,859 | A | 1/1999 | Uytterhoeven |
| 5,948,600 | A | 9/1999 | Roschger |
| 6,261,737 | B1 | 7/2001 | Fujita et al. |
| 6,337,303 | B1 | 1/2002 | Dooms |
| 2003/0057610 | A1 | 3/2003 | Kunita |
| 2005/0003298 | A1 | 1/2005 | Uyttendaele |
| 2006/0125909 | A1 | 6/2006 | Hamada |
| 2008/0057450 | A1 | 3/2008 | Ulrich |
| 2020/0086669 | A1 | 3/2020 | Sakai |

FOREIGN PATENT DOCUMENTS

| | | | | |
|---|---|---|---|---|
| CN | 100470365 | A | 3/2009 | |
| JP | 62-50187 | A | 3/1987 | |
| JP | 6-194781 | A | 7/1994 | |
| JP | 6-317870 | A | 11/1994 | |
| JP | 7-323667 | A | 12/1995 | |
| JP | 9-504239 | A | 4/1997 | |
| JP | 9-127644 | A | 5/1997 | |
| JP | 10-29377 | A | 2/1998 | |
| JP | 11-143075 | A | 5/1999 | |
| JP | 11-198532 | A | 7/1999 | |
| JP | 2000-226528 | A | 8/2000 | |
| JP | 2001-10229 | A | 1/2001 | |
| JP | 2001-10238 | A | 1/2001 | |
| JP | 2001-301345 | A | 10/2001 | |
| JP | 2001-328357 | A | 11/2001 | |
| JP | 2003-295386 | A | 10/2003 | |
| JP | 2004-358972 | A | 12/2004 | |
| JP | 2005-35203 | A | 2/2005 | |
| JP | 2007-203715 | A | 8/2007 | |
| JP | 2008-9461 | A | 1/2008 | |
| JP | 2010-501893 | A | 1/2010 | |
| JP | 2011-51338 | A | 3/2011 | |
| JP | 2019-215385 | A | 12/2019 | |
| TW | 200415035 | A | 8/2004 | |
| TW | I672286 | A | 9/2019 | |
| WO | WO-9610213 | A1 * | 4/1996 | ........... G03C 1/4989 |

* cited by examiner

*Primary Examiner* — Gerard Higgins
(74) *Attorney, Agent, or Firm* — VENABLE LLP

(57) ABSTRACT

Provided is a thermal recording material on which a high contrast image can be formed by exposure to infrared laser radiation. The thermal recording material comprises a light-transmittable support having thereon at least an infrared absorbing layer, a thermal recording layer and a protective layer in order from the closest to the farthest from the support, wherein the infrared absorbing layer comprises an infrared absorbing dye having a ratio of a molar absorption coefficient at 830 nm (ε (830)) to a molar absorption coefficient at 365 nm (ε (365)) (ε (830)/ε (365)) of 4.0 or more, and wherein the thermal recording layer comprises a light-insensitive organic silver salt and is substantially free of a light-sensitive silver halide.

3 Claims, No Drawings

THERMAL RECORDING MATERIAL

TECHNICAL FIELD

The present invention relates to a thermal recording material on which images can be formed by exposure to infrared laser radiation. In particular, the present invention relates to a thermal recording material suitable for preparation of mechanicals.

BACKGROUND ART

High-definition image recording process for preparation of mechanicals has generally been performed by a wet-type image forming process using a light-sensitive silver halide material. Such a wet-type image forming process, however, requires treatment of waste liquid, such as a developer or a fixer, and thus imposes a great environmental burden. This problem has necessitated the investigation of various dry-type image forming processes, which do not require wet processing. Currently, a variety of dry-type image forming systems have made in practice, including inkjet printing, electrophotography and thermal dye transfer printing. However, these dry-type image forming processes cannot produce a so-called high contrast mechanicals that have excellent light shielding properties in an image area and have excellent light transmitting properties in a non-image area.

Some of dry-type image forming processes are capable of produce high contrast images comparable to those produced by a wet-type image forming process using a light-sensitive silver halide material. Specific examples of such dry-type image forming processes include methods involving forming an image on a thermal recording material having a thermal recording layer on a support using a thermal head or an infrared laser beam. Thermal recording using an infrared laser beam has superior performance to others in high-density recording and in high-definition recording. Various thermal recording materials capable of forming images by exposure to infrared laser radiation have been developed. For example, Patent literature 1 discloses a laser addressable thermal recording material capable of recording high-density images, the thermal recording material comprising a thermally reducible source of silver, a reducing agent for silver ions, a dye that absorbs a laser beam in the wavelength range of about 500 to 1100 nm, and a polymeric binder. Patent literature 2 discloses a thermal recording material for infrared laser radiation capable of recording high-definition images, the thermal recording material comprising an organic silver salt, a developer for the organic silver salt, an infrared absorbing dye, and a water soluble binder. Patent literature 3 discloses a thermochromic image forming material with a low UV density and little residual color, the image forming material comprising a light-insensitive organic silver salt, a reducing agent for silver ions, a binder, a tone modifier, and an absorbent that absorbs radiation in the wavelength range of 750 to 1100 nm.

Nevertheless, higher-density and higher-definition images have been required over the past few years. Even when the thermal recording materials disclosed in Patent literatures 1 to 3 are used to prepare mechanicals, the contrast may be insufficient and small size images such as thin lines and very small dots may be lost due to insufficient or excessive dose of radiation to the light-sensitive materials for platemaking. Due to these defects, such thermal recording materials on which images can be formed by exposure to infrared laser radiation are required to have further improved contrast.

Production of thermal recording materials by coating is preferred for high productivity as described in Patent literatures 1 to 3, but so-called coating defects such as cissing and ribbing may occur. If thermal recording materials have coating defects, color development by exposure to infrared laser radiation may not progress normally in the defect areas and may develop pinholes. Development of pinholes is problematic especially in preparation of mechanicals, and reduction of occurrence of pinholes has been demanded.

Surfactants are commonly used to reduce coating defects in the production of thermal recording materials, and this technique is well-known in the art. For example, Patent literature 4 discloses a thermally developable light-sensitive material comprising a specific fluorine compound. The fluorine compound serves as a surfactant to facilitate the coating of a coating liquid that forms a layer contained in the thermally developable light-sensitive material and to prevent occurrence of ribbing, cissing and unevenness. However, further reduction of pinholes has been required. Patent literature 5 discloses an image forming method comprising exposing a thermally developable light-sensitive material comprising light-sensitive silver halide particles, an organic silver salt, a reducing agent and a binder to laser beam radiation to form a visible image by thermal development. The reducing agent may be contained in any layer on the side having an image forming layer in the thermally developable light-sensitive material.

The thermal recording methods using infrared laser beams as described in Patent literatures 1 to 3 involve exposing the thermal recording material to an infrared laser beam, thereby locally heating a thermal recording layer to develop a color for image formation. Such an infrared laser beam is a high energy source, and therefore exposure of the thermal recording material to the infrared laser beam may cause the components of the thermal recording material or the by-products of the color development process of the thermal recording layer to volatilize or burst and scatter around the surface of the thermal recording material as ejected debris. The components or by-products volatilized or scattered as ejected debris may tend to contaminate the surface of the thermal recording material or an infrared laser radiation device.

When a thermal recording material is used as a printing plate material, the UV transmission density of an image area is commonly measured using a transmission densitometer to optimize the dose of infrared laser radiation. However, commercially available transmission densitometers for measurement of UV transmission densities are limited nowadays, and sometimes this shortage of the transmission densitometers can be an obstacle to carrying out the optimization of the dose of infrared laser radiation. Most of commercially available transmission densitometers are for measurement of only visible light transmission density, and thus there is a need for an alternative approach to optimization of the dose of infrared laser radiation through measurement of visible light transmission density in the same manner as when the dose of infrared laser radiation is optimized by measuring UV transmission density.

Conventional thermal recording materials may contain a toning agent (toner) to adjust the tone and density of an image to be formed on the materials. For example, Patent literature 1 as described above exemplifies phthalazinone, phthalazine and phthalimide as conventional toners. Patent literature 6 discloses a thermally developable light-sensitive material comprising an image forming layer comprising a light-sensitive silver halide, a light-insensitive organic silver salt and a reducing agent; and a light-insensitive layer, wherein the thermally developable light-sensitive material further comprises phthalazinones and phthalic acids as toning agents. Patent literature 7 discloses a light-insensitive thermographic recording material that exhibits an acceptably neutral image tone, the light-insensitive thermographic recording material comprising a support and on one side of said support a thermosensitive element, said thermosensitive element comprising a light-insensitive silver salt of a carboxylic acid, a reducing agent and a particular binder, wherein the thermosensitive element further contains a toning agent selected from phthalazinone, phthalazinone derivatives, etc. Patent literature 8 discloses an infrared laser addressable imaging element. The imaging element may contain a polymer that comprises specific repeating units and produces carboxylic acid by cleavage reaction at elevated temperature, and polar groups such as carboxylic acid influence the morphology of the silver metal image, and hence improve its tone.

As the dose of infrared laser radiation increases, the UV transmission density of the thermal recording materials as disclosed in Patent literatures 1 to 8 described above will increase, but the visible light transmission density remains nearly the same. Due to this characteristics, visible light transmission density has not been used for the optimization of the dose of infrared laser radiation.

Patent literature 2 discloses a thermal recording material for infrared laser beams, the thermal recording material comprising a thermosensitive layer comprising an organic silver salt, a developer, a water soluble binder, and a specific merocyanine compound as an infrared absorbing dye. The thermal recording material may further comprise a carboxylic acid as a stabilizer to prevent heat-induced browning and stabilize the background after image formation.

CITATION LIST

Patent Literature

Patent literature 1: JP H06-194781 A
Patent literature 2: JP H10-29377 A
Patent literature 3: JP 2001-10229 A
Patent literature 4: JP 2003-295386 A
Patent literature 5: JP 2008-9461 A
Patent literature 6: JP 2019-215385 A
Patent literature 7: JP 2004-358972 A
Patent literature 8: JP H09-127644 A

SUMMARY OF INVENTION

Technical Problem

A first object of the invention is to provide a thermal recording material on which a high contrast image can be formed by exposure to infrared laser radiation.

A second object of the invention is to provide a thermal recording material on which a high contrast image can be formed by exposure to infrared laser radiation, wherein the occurrence of pinholes is reduced.

A third object of the invention is to provide a thermal recording material on which a high contrast image can be formed by exposure to infrared laser radiation, wherein the generation of ejected debris from the surface of the thermal recording material is reduced.

A fourth object of the invention is to provide a thermal recording material on which a high contrast image can be formed by exposure to infrared laser radiation, wherein the dose of infrared laser radiation can be optimized by measuring the visible light transmission density of an image area.

Solution to Problem

The problems as described above can be solved by the invention as described below.

The first object can be solved by a first aspect of the invention that provides a thermal recording material comprising a light-transmittable support having thereon at least an infrared absorbing layer, a thermal recording layer and a protective layer in order from the closest to the farthest from the support, wherein the infrared absorbing layer comprises an infrared absorbing dye having a ratio of a molar absorption coefficient at 830 nm (ε (830)) to a molar absorption coefficient at 365 nm (ε (365)) (ε (830)/ε (365)) of 4.0 or more, and wherein the thermal recording layer comprises a light-insensitive organic silver salt and is substantially free of a light-sensitive silver halide.

The second object can be solved by a second aspect of the invention wherein the infrared absorbing layer contained in the thermal recording material according to the first aspect of the invention further comprises a reducing agent.

The third object can be solved by a third aspect of the invention wherein the protective layer of the thermal recording material according to the first aspect of the invention comprises hydrophilic particles and a hydrophobic resin, wherein the protective layer has a thickness of 2.3 to 9.4 μm.

The fourth object can be solved by a fourth aspect of the invention that provides an thermal recording material comprising a light-transmittable support having thereon at least an infrared absorbing layer, a thermal recording layer and a protective layer in order from the closest to the farthest from the support, wherein the infrared absorbing layer comprises an infrared absorbing dye, and wherein the thermal recording layer comprises a light-insensitive organic silver salt, a reducing agent, and at least one compound selected from the group of compounds represented by the following general formulas (1) to (4):

General formula (1)

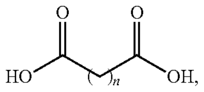

General formula (2)

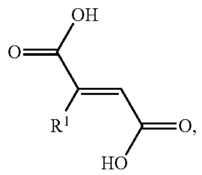

General formula (3)

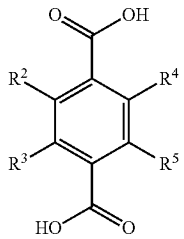

and

-continued

General formula (4)

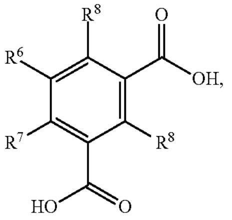

wherein n in the general formula (1) represents an integer of 2 to 7; $R^1$ in the general formula (2) represents a hydrogen atom or a methyl group; and $R^2$ to $R^9$ in the general formulas (3) and (4) each represent a hydrogen atom, a methyl group or a methoxy group.

Advantageous Effects of Invention

A first aspect of the invention provides a thermal recording material on which a high contrast image can be formed by exposure to infrared laser radiation.

A second aspect of the invention provides a thermal recording material on which a high contrast image can be formed by exposure to infrared laser radiation, wherein the occurrence of pinholes is reduced.

A third aspect of the invention provides a thermal recording material on which a high contrast image can be formed by exposure to infrared laser radiation, wherein the generation of ejected debris from the surface of the thermal recording material is reduced.

A fourth aspect of the invention provides a thermal recording material on which a high contrast image can be formed by exposure to infrared laser radiation, wherein the dose of infrared laser radiation can be optimized by measuring the visible light transmission density of an image area.

DESCRIPTION OF EMBODIMENTS

The present invention will be described in detail below.

The thermal recording material of the invention comprises a light-transmittable support having thereon an infrared absorbing layer, a thermal recording layer and a protective layer, as described later, in order from the closest to the farthest from the support. The light-transmittable support may be, for example, a resin film made of polyethylene terephthalate (PET), polyethylene naphthalate, cellulose nitrate, polycarbonate, etc., or a support made of an inorganic material, such as glass etc. The light-transmittable support herein refers to a support having a total light transmittance of 60% or more, and preferred is a support having a total light transmittance of 70% or more. The light-transmittable support preferably has a haze value of 10% or less. The light-transmittable support may have a known layer, such as an easily adhesive layer, a hard coating layer, or an antistatic layer. The thickness of the light-transmittable support according to the invention is not limited to a particular one, and may be 50 to 300 μm for ease of handling.

The infrared absorbing layer contained in the thermal recording material of the invention contains an infrared absorbing dye. The infrared absorbing dye herein refers to a known compound that absorbs infrared radiation. Among others, preferred is an infrared absorbing dye that absorbs electromagnetic radiation in the wavelength range of 600 to 1500 nm, more preferred is an infrared absorbing dye that has the maximum absorption in the wavelength range of 650 to 1100 nm, and further preferred is an infrared absorbing dye that has the maximum absorption in the wavelength range of 750 to 1100 nm. Such an infrared absorbing dye according to the invention can used to produce a thermal recording material on which a high contrast image suitable for preparation of mechanicals can be formed. The thermal recording material of the invention thus preferably has an infrared absorbing layer that has a small absorption over the wavelength range of 350 to 450 nm, which corresponds to the ultraviolet region where light emission peaks of high-pressure mercury lamps and chemical lamps are observed. In other words, the thermal recording material of the invention preferably has, on the light-transmittable support, an infrared absorbing layer containing an infrared absorbing dye having a ratio of a molar absorption coefficient at 830 nm (ε (830)) to a molar absorption coefficient at 365 nm (ε (365)) (ε (830)/ε (365)) of 4.0 or more. The thermal recording material comprising an infrared absorbing layer containing an infrared absorbing dye having a ratio of ε (830)/ε (365) of 4.0 or more can serve as a thermal recording material on which a high contrast image can be formed by exposure to infrared laser radiation.

Since the infrared absorbing dye according to the invention is used to produce a thermal recording material on which a high contrast image suitable for preparation of mechanicals can be formed, the absorption of electromagnetic waves in the wavelength range of 350 to 450 nm, which corresponds to the ultraviolet region where light emission peaks of high-pressure mercury lamps and chemical lamps are observed, by the infrared absorbing dye is preferably as small as possible compared with its absorption of electromagnetic waves in the wavelength range of 600 to 1500 nm. In other words, the infrared absorbing dye preferably has a ratio of the absorbance at the maximum in the wavelength range of 600 to 1500 nm (ε1) to the absorbance at the maximum in the wavelength range of 350 to 450 nm (ε2) (ε1/ε2) of 4.0 or more. The thermal recording material comprising an infrared absorbing layer containing an infrared absorbing dye having a ratio of ε1/ε2 of 4.0 or more can serve as a thermal recording material on which a high contrast image can be formed by exposure to infrared laser radiation.

The infrared absorbing dye as described in paragraphs 0027 and 0028 above includes compounds having a polymethine skeleton, including squarylium, cyanine, merocyanine, and bis(aminoaryl)polymethine. Specific examples of the infrared absorbing dye include, but are not limited to, compounds represented by the following general formulas (5) to (7):

General formula (5)

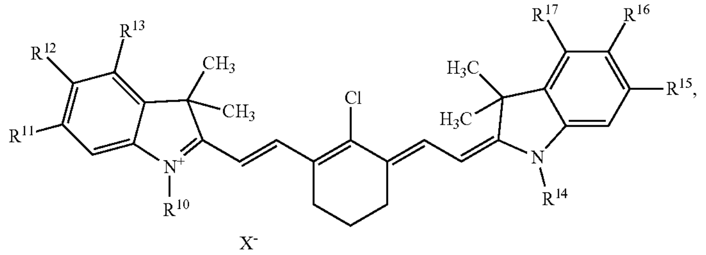

General formula (6)

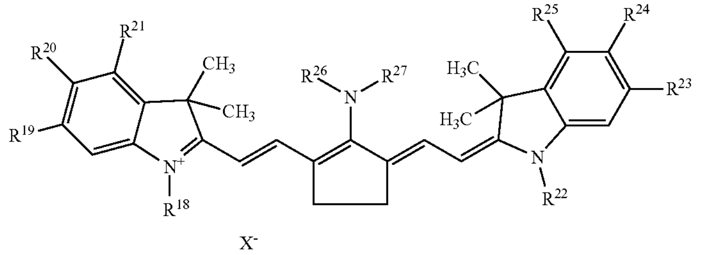

and

General formula (7)

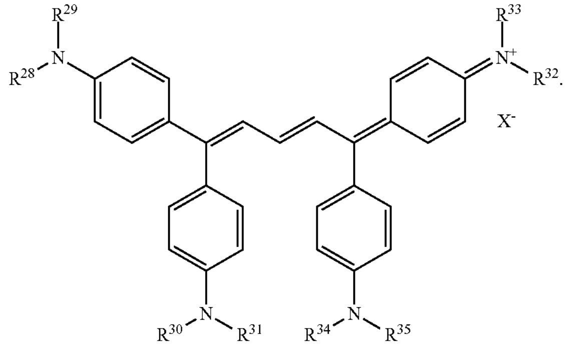

In the general formulas (5) to (7), $R^{10}$ to $R^{35}$ each represent substituents selected from, for example, a hydrogen atom, an alkyl group, an aryl group, an alkoxy group, an acyl group, an ester group, an amide group, a halogen atom, a hydroxy group, a thiol group, a thioether group, a sulfonyl group, etc. The substituents may be the same or different from each other, and may form a ring structure with any one of the substituents. $X^-$ represents an atom or group with a negative charge, including halogen ions, oxo acids such as a perchlorate ion, tetrafluoroborates, hexafluorophosphates, alkyl and aryl sulfonates, etc. Specific examples of the infrared absorbing dye include, but are not limited to, compounds represented by the following exemplary compounds (1) to (7):

Exemplary compound (1)

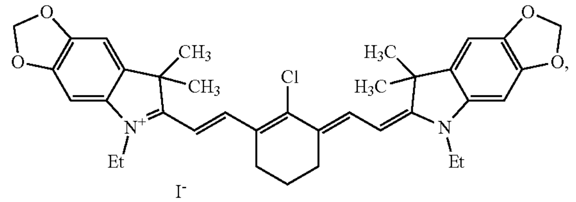

-continued

Exemplary compound (2)

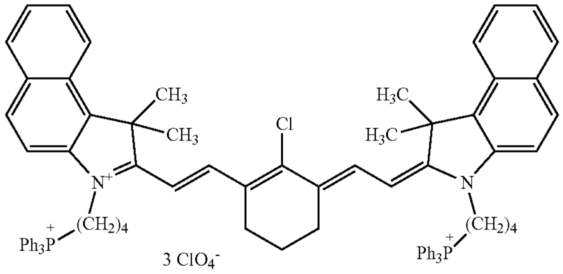

,

Exemplary compound (3)

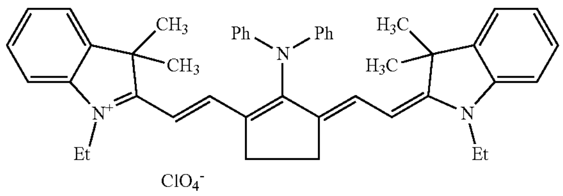

,

-continued

Exemplary compound (4)

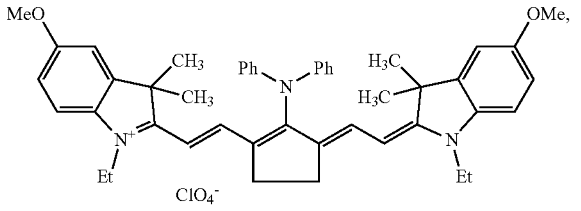

Exemplary compound (5)

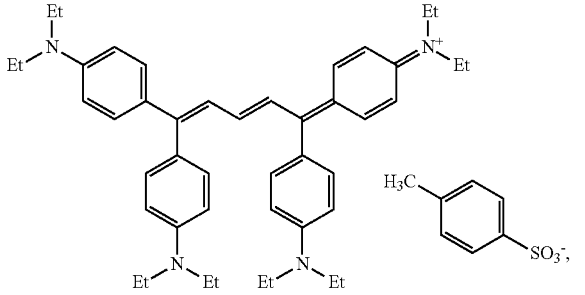

Exemplary compound (6)

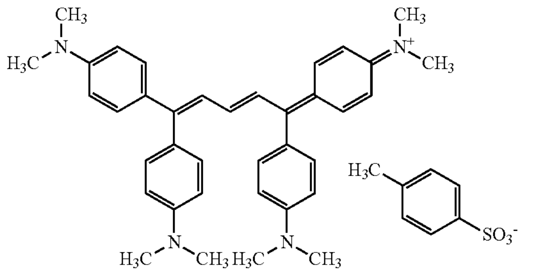

and

Exemplary compound (7)

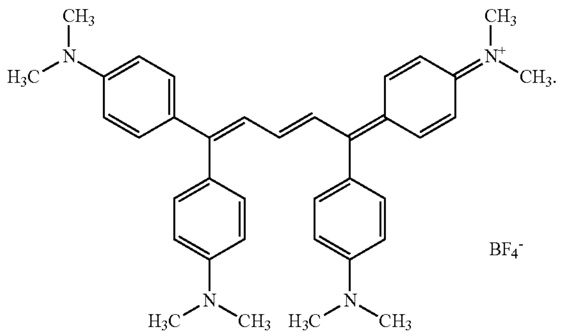

The values of ε (830), ε (365), ε1 and ε2 of the infrared absorbing dye can be determined by preparing a solution of the infrared absorbing dye in 2-butanone and measuring the absorption spectrum of the solution using an ultraviolet-visible spectrometer UV-2600 (Shimadzu Corporation) using a quartz cell with an optical path length of 1 cm.

The term "high contrast image" herein means that the value calculated from the formula Dmax−Dmin, which indicate the difference between the UV transmission density of an image area (Dmax) and the UV transmission density of a non-image area (Dmin), is 3.0 or more. More preferably, the value calculated from the formula Dmax−Dmin is 3.5 or more. The UV transmission density may be measured using, for example, X-Rite (registered trademark) 361T (X-Rite, Incorporated.) in UV mode.

The amount of the infrared absorbing dye in the infrared absorbing layer is, but not limited to, preferably 0.1 to 20% by mass, more preferably 0.2 to 17.5% by mass, and particular preferably 0.3 to 15% by mass of the total solid content of the infrared absorbing layer.

The infrared absorbing layer herein may contain a single type of infrared absorbing dye or two or more types of infrared absorbing dyes.

The thermal recording material having the infrared absorbing layer containing the infrared absorbing dye as described above is capable of producing a high contrast image by exposure to infrared laser radiation, but due to this capability of producing a high contrast image, the thermal recording material may produce minute pinholes. Preferably, the occurrence of such minute pinholes can be reduced by addition of a reducing agent to the infrared absorbing layer containing the infrared absorbing dye in the thermal recording material of the invention.

The reducing agent contained in the infrared absorbing layer may be, but is not limited to, known reducing agents, including aldehyde compounds such as glyoxal, glutaraldehyde and 3-methylglutaraldehyde; hydrazine compounds such as hydrazine sulfate and hydrazine carbonate; polyhydroxybenzene compounds such as hydroquinone, catechol, 4-methylcatechol, 4-tert-butylcatechol, chlorohydroquinone and pyrogallol; polyhydroxybenzoic acid compounds such as gallic acid, methyl gallate, propyl gallate, 3,4-dihydroxybenzoic acid and ethyl 3,4-dihydroxybenzoate; aminophenol compounds such as 2-aminophenol, 3-aminophenol and 4-aminophenol; sugars such as glucose and fructose; and ascorbic acid compounds such as ascorbic acid, isoascorbic acid, ascorbyl stearate and ascorbyl palmitate. Polyhydroxybenzene compounds and polyhydroxybenzoic acid compounds are preferred among these reducing agents because these compounds effectively inhibit the occurrence of pinholes.

The amount of the reducing agent contained in the infrared absorbing layer may be, but is not limited to, preferably 1 to 25% by mass, more preferably 2 to 20% by mass, and particularly preferably 3 to 16% by mass of the total solid content of the infrared absorbing layer.

The infrared absorbing layer herein may contain a single type of reducing agent or two or more types of reducing agents.

The infrared absorbing layer herein preferably contains a binder component together with the infrared absorbing dye. The binder component is preferably a thermoplastic resin. Examples of the thermoplastic resin include cellulose derivatives such as hydroxyethyl cellulose and hydroxypropyl cellulose; and polyvinyl acetal resins, polyvinyl alcohol resins and others, such as an acrylic resin, a polyester resin, a polyurethane resin, a vinyl chloride resin, a vinyl acetate resin, a polyolefin resin and a polyvinyl butyral resin. These binder components are used in the form of a solution dissolved in water or an organic solvent, or in the form of a latex in which hydrophobic polymer solids are dispersed as fine particles, or in the form of a dispersion in which micelles of polymer molecules are dispersed. These binder components herein are preferably capable of forming a transparent coating after drying. If necessary, two or more types of resins miscible with each other may be used as the binder component.

The infrared absorbing layer contained in the thermal recording material of the invention is preferably formed by blending the infrared absorbing dye, the binder component and other optional components added as needed to prepare a coating liquid for forming the infrared absorbing layer, then coating the coating liquid onto the light-transmittable support, and drying the coating liquid. The coating thickness of the infrared absorbing layer is preferably 0.01 to 5.0 μm. The amount of the coating liquid for forming the infrared absorbing layer coated onto the support in terms of dry mass is preferably 0.01 to 8.0 $g/m^2$, and more preferably 0.05 to 5.0 $g/m^2$.

The coating liquid for forming the infrared absorbing layer may contain a surfactant selected from various types for the purpose of improving the coating properties. The surfactant may be any type, including, but not limited to, nonionic surfactants, anionic surfactants and cationic surfactants.

The thermal recording layer in the thermal recording material of the invention contains a light-insensitive organic silver salt. The organic silver salt is reduced by heating with a reducing agent (described later) to form a silver image. Specific examples of the light-insensitive organic silver salt include silver salts of organic acids such as gallic acid, oxalic acid, behenic acid, stearic acid, palmitic acid or lauric acid, as described in Research Disclosure Items 17029 (II) and 29963 (XVI) regarding thermally developable light-sensitive materials; silver salts of carboxyalkylthiourea such as 1-(3-carboxypropyl)thiourea or 1-(3-carboxypropyl)-3,3-dimethylthiourea; complexes of silver and a polymeric reaction product of an aldehyde such as formaldehyde, acetaldehyde or butyraldehyde and an aromatic carboxylic acid such as salicylic acid, benzoic acid, 3,5-dihydroxybenzoic acid or 5,5-thiodisalicylic acid; silver salts or silver complexes of thiones such as 3-(2-carboxyethyl)-4-hydroxymethyl-4-thiazoline-2-thione or 3-carboxymethyl-4-methyl-4-thiazoline-2-thione; silver salts or silver complexes of nitrogen-containing heterocyclic rings selected from imidazole, pyrazole, urazole, 1,2,4-triazole, 1H-tetrazole, 3-amino-5-benzylthio-1,2,4-triazole and benzotriazole; silver salts of saccharin or 5-chlorosalicylaldoxime; and silver salts of mercaptides. Silver salts of fatty acids of 10 or more carbon atoms are preferred among these, and silver stearate and silver behenate are particularly preferred.

The amount of the organic silver salt contained in the thermal recording layer of the invention can be adjusted as appropriate depending on the maximum concentration required when the thermal recording material is used as a mechanical, and is preferably 0.2 to 3.0 g per square meter and more preferably 0.5 to 2.0 g per square meter in terms of the amount of silver.

The thermal recording layer in the invention is substantially free of a silver halide. The term "substantially free of a silver halide" means that the amount of a silver halide contained in the thermal recording layer is less than 1% of the total solid content of the thermal recording layer. When the thermal recording layer is substantially free of a silver halide, increase in the UV transmission density of a non-image area in the thermal recording material of the invention is prevented during storage and ordinary use. Thus, the thermal recording material can serve as a thermal recording material for platemaking for making a high contrast image.

The thermal recording layer in the invention preferably contains a reducing agent. Examples of the reducing agent include polyhydroxybenzene compounds such as hydroquinone, catechol, 4-methylcatechol, 4-tert-butylcatechol, chlorohydroquinone and pyrogallol; polyhydroxybenzoic acid compounds such as gallic acid, methyl gallate, propyl gallate, stearyl gallate, 2,5-dihydroxybenzoic acid, 3,4-dihydroxybenzoic acid and ethyl 3,4-dihydroxybenzoate; aminophenol compounds such as 2-aminophenol, 3-aminophenol and 4-aminophenol; 1-phenyl-3-pyrazolidone and its derivatives; hydroxylamines; polyhydroxy indans described in JP H06-317870 A; and dihydroxybenzoic acid derivatives described in JP 2001-328357 A. Polyhydroxybenzene compounds and polyhydroxybenzoic acid compounds are preferred among these reducing agents because the thermal recording layer containing any of these compounds is capable of producing a high contrast image.

The amount of the reducing agent contained in the thermal recording layer may widely vary depending on the type of reducing agent or the type of organic silver salt, but is preferably 0.1 to 3.0 mol per mol of the organic silver salt, and more preferably 0.5 to 2.0 mol per mol of the organic silver salt. Two or more types of reducing agents may be used depending on various purposes.

The thermal recording layer in the invention preferably contains at least one compound selected from the group of compounds represented by the following general formulas (1) to (4):

General formula (1)

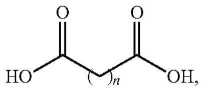

General formula (2)

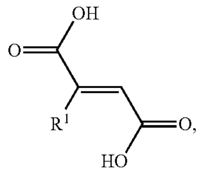

General formula (3)

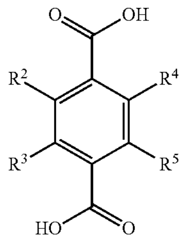

and

General formula (4)

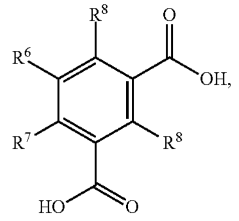

wherein n in the general formula (1) represents an integer of 2 to 7; $R^1$ in the general formula (2) represents a hydrogen atom or a methyl group; and $R^2$ to $R^9$ in the general formulas (3) and (4) each represent a hydrogen atom, a methyl group or a methoxy group.

When the thermal recording layer of the thermal recording material contains at least one compound selected from the group of compounds represented by the general formulas (1) to (4), the visible light transmission density of an image area in the thermal recording material increases as the dose of infrared laser radiation increases. The general formula (1) represents a linear dicarboxylic acid wherein n=2 to 7, and specifically represents succinic acid, glutaric acid, adipic acid, pimelic acid, suberic acid or azelaic acid. When the thermal recording material contains oxalic acid which is a compound represented by the general formula (1) wherein n=0 or malonic acid which is a compound represented by the general formula (1) wherein n=1, the UV transmission density of a non-image area (Dmin) may be markedly increased. When the thermal recording material contains a linear dicarboxylic acid which is a compound represented by the general formula (1) wherein n≥8, the amount of increase in the visible light transmission density due to increase in the dose of infrared laser radiation may be small. The general formula (2) specifically represents fumaric acid and mesaconic acid. The general formula (3) represents terephthalic acid or a terephthalic acid derivative, and specifically represents terephthalic acid, 2-methylterephthalic acid, 2,5-dimethylterephthalic acid, 2-hydroxyterephthalic acid, etc. The general formula (4) represents isophthalic acid or an isophthalic acid derivative, and specifically represents isophthalic acid, 5-methylisophthalic acid, 4,6-dimethylisophthalic acid, 5-methoxyisophthalic acid, 4-hydroxyisophthalic acid, 5-hydroxyisophthalic acid, etc. Among the above compounds, a linear dicarboxylic acid represented by the general formula (1) wherein n=2 to 4 or a compound having a fumaric acid skeleton or an isophthalic acid skeleton are preferred because these compounds effectively increases the visible light transmission density of an image area as the dose of infrared laser radiation increases. More preferred are succinic acid, fumaric acid, isophthalic acid and isophthalic acid derivatives among others. Two or more types of compounds selected from the above compounds may be used depending on various purposes.

The amount of the compound represented by any of the general formulas (1) to (4) contained in the thermal recording layer may be, but is not limited to, preferably 0.05 to 15% by mass, more preferably 0.1 to 10% by mass, and particularly preferably 0.5 to 5% by mass of the total solid content of the thermal recording layer.

The visible light transmission density and the UV transmission density may be measured using, for example, X-Rite (registered trademark) 361T (X-Rite, Incorporated.) in visible light mode and UV mode, respectively.

The thermal recording layer in the thermal recording material of the invention preferably contains a so-called toning agent, which is known in the field of thermography or photothermography. Examples of the toning agent include known toning agents as described in Research Disclosure Items 17029 (V) and 29963 (XXII) regarding thermally developable light-sensitive materials. Specific examples of the toning agent include imides such as phthalimide; mercapto compounds such as 3-mercapto-1,2,4-triazole; phthalic acid derivatives such as phthalazine, phthalazone, 4-methylphthalic acid, tetrachlorophthalic acid and anhydrides thereof; benzoxazine derivatives such as 1,3-benzoxazine-2,4-dione; etc. Two or more types of toning agents may be used depending on various purposes.

The thermal recording layer in the thermal recording material of the invention may contain various types of promoting agents or stabilizers or precursors thereof to inhibit or promote the formation of image-forming silver, or to improve the storability of the thermal recording material before and after image formation, or to achieve other purposes. Specifically, such promoting agents or stabilizers or precursors thereof can be selected from known stabilizers or inhibitors for photographs, including benzotriazole, 5-methylbenzotriazole, 5-chlorobenzotriazole, 2-mercaptobenzotriazole, 2-mercaptobenzimidazole, 2-mercaptobenzothiazole, 2-mercaptobenzoxazole, 4-hydroxy-6-methyl-1,3,3a, 7-tetraazaindene, 1-phenyl-5-mercaptotetrazole, 2-amino-5-mercapto-1,3,4-thiadiazole, 3-mercapto-5-phenyl-1,2,4-triazole, 4-benzamide-3-mercapto-5-phenyl-1,2,4-triazole, etc. Two or more types of promoting agents or stabilizers may be used depending on various purposes.

The thermal recording layer in the thermal recording material of the invention preferably contains a binder component to retain the light-insensitive organic silver salt. The binder component is preferably a thermoplastic resin. For example, the binder component is preferably the thermoplastic resin used for the infrared absorbing layer as described above. If necessary, two or more types of resins miscible with each other may be used as the binder component.

The amount of the binder component contained in the thermal recording layer is preferably 10 to 70% by mass of the total solid content of the thermal recording layer.

The binder component contained in the thermal recording layer is preferably free of free halide ions such as chloride ions or bromide ions. Halide ions react with the silver ions of the organic silver salt to form a light-sensitive silver halide and may reduce the light resistance of the thermal recording material of the invention. Specifically, the amount of halide ions contained in the thermal recording layer is preferably 500 ppm or less, more preferably 300 ppm or less and further preferably 100 ppm or less relative to the amount of the binder component.

The thermal recording layer may contain an additive known in the art in addition to the components as described above, and examples of the additive that can be contained in the thermal recording layer include ultraviolet absorbers, antioxidants, silane coupling agents, pigments, dyes, pH adjusting agents, surfactants, defoaming agents, thickeners, softening agents, lubricants, antistatic agents, anti-blocking agents, etc.

The thermal recording layer in the invention preferably resides adjacent to the infrared absorbing layer without an intervening layer. Due to this configuration, the formation of an image by exposure to infrared laser radiation efficiently performed and, in particular, a high contrast image can be obtained. The thermal recording layer is preferably formed by blending the organic silver salt, the reducing agent, the toning agent, the binder component, etc. as described above to prepare a coating liquid for forming the thermal recording layer, then coating the coating liquid onto the infrared absorbing layer as described above, and drying the coating liquid. The coating thickness of the thermal recording layer is preferably 0.5 to 20 μm. The amount of the coating liquid for forming the thermal recording layer coated onto the infrared absorbing layer in terms of dry mass is preferably 2.0 to 30.0 $g/m^2$, more preferably 5.0 to 20.0 $g/m^2$ and further preferably 7.0 to 15.0 $g/m^2$.

The coating liquid for forming the thermal recording layer may contain a surfactant selected from various types for the purpose of improving the coating properties. The surfactant may be any type, including, but not limited to, nonionic surfactants, anionic surfactants and cationic surfactants.

The thermal recording material of the invention has a protective layer on the thermal recording layer for preventing the thermal recording layer from contacting with a light-sensitive material and protecting the thermal recording layer from impact during handling or other damages, and for reducing ejected debris generated from the surface of the thermal recording material due to exposure to infrared laser radiation. The protective layer preferably contains a resin component, and specific examples of the resin component include gelatin, acrylic resins, polyester resins, polyurethane resins, vinyl chloride resins, vinyl acetate resins, polyolefin resins, polyvinyl alcohol resins, polyvinyl acetal resins, etc. These resins and water dispersions of these resins are commercially available and easily acquired from the suppliers. The protective layer may further contain a crosslinking agent to improve its scratch resistance.

The protective layer in the invention may contain a matting agent selected from various types to improve vacuum properties and scratch resistance. Preferably the matting agent is dispersed in the protective layer during the preparation of the protective layer. Dispersion of the matting agent is performed as appropriate using a high speed stirrer such as Homogenizing Disper.

The matting agent may be an organic or inorganic matting agent. Examples of the organic matting agent include silicone, polytetrafluoroethylene, polymethylmethacrylate, polyacrylate, etc. Examples of the inorganic matting agent include silica, alumina, talc, mica, etc. Examples of commercially available matting agents include TOSPEARL (registered trademark) 120, TOSPEARL 130, TOSPEARL 145 and TOSPEARL 2000B, which are silicone resin-based matting agents commercially available from Momentive Performance Materials Japan LLC.; SUNSPHERE (registered trademark) H-31, SUNSPHERE H-51 and SUNSPHERE NP-30, which are silica-based matting agents commercially available from AGC Si-Tech Co., Ltd.; etc. These products are fine particles of a single type of matting agent, but the matting agent may be either fine particles of a single type of matting agent or fine particle aggregates in which fine particles are gathered in aggregates.

The amount of the matting agent contained in the protective layer is preferably 0.5 to 40% by mass and more preferably 1 to 30% by mass of the total amount of the resin components in the protective layer.

The protective layer in the invention is preferably formed by blending the resin component, the matting agent, etc. as described above to prepare a coating liquid for forming the protective layer, then coating the coating liquid onto the thermal recording layer, and drying the coating liquid. The coating liquid for forming the protective layer may contain a surfactant selected from various types for the purpose of improving the coating properties. The surfactant may be any type, including, but not limited to, nonionic surfactants, anionic surfactants and cationic surfactants.

The protective layer in the invention preferably contains hydrophilic particles and a hydrophobic resin. This configuration containing hydrophilic particles and a hydrophobic resin is preferred because ejected debris generated due to exposure to infrared laser radiation can effectively be reduced. Although the mechanism by which this configuration inhibits the generation of ejected debris is unknown, it is assumed that hydrophilic particles have a limited affinity for a hydrophobic resin and thus small space is formed between the hydrophilic particles and the hydrophobic resin. Then, the components of the thermal recording material volatilized due to exposure to infrared laser radiation or the by-products generated during color development process may smoothly flow through the small space between the hydrophilic particles and the hydrophobic resin. Probably in this manner, the components of the thermal recording material are prevented from bursting and scattering around the surface of the thermal recording material and the generation of ejected debris is inhibited.

The term “hydrophilic particles” refers to particles having a surface that is easily wetted with water. Specific examples of the hydrophilic particles include particles of inorganic materials that are easily wetted with water, such as metals such as gold, silver and copper, metal oxides such as silica, alumina and zirconia, laminar silicate, or composites of these; particles of organic materials that are easily wetted with water, such as acrylic particles, styrene particles or melamine particles; particles of organic and/or inorganic composite materials that are easily wetted with water; etc. Whether particles are hydrophilic are determined by, for example, adding 0.1 g of the particles to 10 mL of pure water measured in a glass beaker, stirring the mixture and leaving it to stand for 10 minutes, and determining that the particles are hydrophilic when the particles do not float on the surface of the water due to separation from water. The hydrophilic particles may have surface treatment known in the art. Two or more types of hydrophilic particles may be used together.

Hydrophilic inorganic particles are preferred among the hydrophilic particles as described above because hydrophilic inorganic particles effectively reduce ejected debris generated from the surface of the thermal recording material due to exposure to infrared laser radiation.

The minimum mean particle size of the hydrophilic particles is not limited to a particular one but is preferably 1 μm or more because the hydrophilic particles with such a minimum mean particle size effectively reduce ejected debris generated from the surface of the thermal recording material due to exposure to infrared laser radiation. The maximum mean particle size of the hydrophilic particles is not limited to a particular one but is preferably 10 μm or less because the hydrophilic particles with such a maximum mean particle size contribute to the formation of a high contrast image. The mean particle size may be a mean particle size calculated based on the volume of the particles as determined by measurement of particle size distribution by laser diffraction/scattering. Specifically, the mean particle size may be determined using, for example, a laser diffraction/scattering particle size distribution analyzer MT3000II (MicrotracBEL Corp.)

The hydrophilic particles that are preferably contained in the protective layer may be commercially available products. Examples of commercially available silica particles include SEAHOSTAR (registered trademark) KE series available from Nippon Shokubai Co., Ltd.; SUNSPHERE (registered trademark) series available from AGC Si-Tech Co., Ltd.; SYLYSIA (registered trademark) series available from Fuji Silysia Chemical Ltd.; etc. Examples of commercially available alumina particles include Milled Alumina SA30 series, SA40 series and SMM series available from Nippon Light Metal Co., Ltd., etc. Examples of commercially available acrylic particles include Chemisnow (registered trademark) MX series available from Soken Chemical & Engineering Co., Ltd.; TECHPOLYMER (registered trademark) AQS series available from Sekisui Kasei Co., Ltd.; etc. Examples of commercially available melamine particles include OPTBEADS (registered trademark) series available from Nissan Chemical Corporation, EPOSTAR (registered trademark) series available from Nippon Shokubai Co., Ltd.; etc. All of the particles exemplified above are preferred.

The amount of the hydrophilic particles contained in the protective layer is not limited to a particular one but is preferably 1.2 to 40% by mass and more preferably 1.6 to 30% by mass of the total solid content of the protective layer.

The protective layer in the invention may contain a hydrophobic resin in an amount equal to or less than the amount of the hydrophilic particles contained in the protective layer. The amount of the hydrophobic resin is preferably 50% by mass or less relative to the amount of the hydrophilic particles contained in the protective layer, and the amount of the hydrophobic resin is particularly preferably 25% by mass or less relative to the amount of the hydrophilic particles contained in the protective layer.

The hydrophobic resin used in combination with the hydrophilic particles in the protective layer is not limited to a particular one, and may be a hydrophobic resin known in the art, including acrylic resins, urethane resins, silicone resins, acrylic urethane resins, polyester resins, cellulose acetate resins, epoxy resins, etc. The term "hydrophobic resin" refers to a resin whose solubility in 100 g of water at 25° C. is less than 1 g. Two or more types of hydrophobic resins may be used together.

The protective layer containing the hydrophilic particles and the hydrophobic resin as described above is preferably formed by blending the hydrophilic particles, a polyvalent isocyanate compound and a polyol compound to prepare a coating liquid for forming the protective layer, then coating the coating liquid onto the thermal recording layer, and drying the coating liquid. The protective layer prepared in this manner is capable of effectively reducing ejected debris generated from the surface of the thermal recording material due to exposure to infrared laser radiation. The polyol compound is crosslinked with the polyvalent isocyanate compound to give various types of urethane resins, which serve as hydrophobic resins. The polyvalent isocyanate compound is preferably a compound having two or more isocyanate groups in the molecule. Examples of such a polyvalent isocyanate compound include polyvalent aliphatic isocyanate compounds, such as dimethylene diisocyanate, tetramethylene diisocyanate, hexamethylene diisocyanate, decane diisocyanate, or isophorone diisocyanate; polyvalent aromatic isocyanate compounds, such as tolylene diisocyanate, 1,3-phenylene diisocyanate, 1,3-dimethylbenzole-2,6-diisocyanate, or naphthalene-1,4-diisocyanate; dimer or trimer adducts formed from a single type or two or more types of polyvalent isocyanate compounds as described above; adducts formed by reaction of such a polyvalent isocyanate compound and a divalent or trivalent polyol; etc. Among these, the polyvalent aliphatic isocyanate compound is preferably hexamethylene diisocyanate or its adducts, and the polyvalent aromatic isocyanate compound is preferably tolylene diisocyanate or its adducts. The polyvalent isocyanate compound may be a single type or in combination of two or more types depending on various purposes. The polyvalent isocyanate compound may be a commercial product available as an isocyanate crosslinking agent and such a commercially available product is directly used. Specific examples of the commercially available product include BURNOCK (registered trademark) series available from DIC Corporation, and CORONATE (registered trademark) series available from Tosoh Corporation.

The amount of the polyvalent isocyanate compound contained in the protective layer is preferably 59 to 95% by mass, more preferably 59 to 90% by mass, and further preferably 59 to 80% by mass of the total solid content of the coating liquid for forming the protective layer. The polyvalent isocyanate compound in this amount contributes to good alcohol resistance of the surface of the thermal recording material. When the amount of the polyvalent isocyanate compound is less than 59% by mass, the alcohol resistance of the surface of the thermal recording material may be insufficient. When the amount of the polyvalent isocyanate compound is more than 95% by mass, the skin-over time may be extended and the productivity may be reduced.

Examples of the polyol compound include cellulose derivatives, such as cellulose acetate, hydroxyethyl cellulose and hydroxypropyl cellulose; copolymers of a polyhydric alcohol and a monomer selected from various types, such as acrylic polyols, polyether polyols, polyester polyols and polycarbonate polyols; etc. These high-molecular-weight compounds may be a single type or in combination of two or more types depending on various purposes. Among these, acrylic polyols are more preferred. Examples of commercially available acrylic polyols include ACRYDIC (registered trademark) series (DIC Corporation), and #6000 series (Taisei Fine Chemical Co., Ltd.). Thus the protective layer in the invention preferably contains an acrylic urethane resin produced by reaction of an acrylic polyol and a polyvalent isocyanate.

The protective layer containing the hydrophilic particles and the hydrophobic resin may contain a hydrophilic resin in an amount equal to or less than the amount of the hydrophobic resin contained in the protective layer. The amount of the hydrophilic resin is preferably 50% by mass or less relative to the amount of the hydrophobic resin contained in the protective layer, and the amount of the hydrophilic resin is particularly preferably 25% by mass or less relative to the amount of the hydrophobic resin contained in the protective layer.

The protective layer containing the hydrophilic particles and the hydrophobic resin may contain an additive known in the art in addition to the components as described above. Examples of the additive that can be contained in the protective layer include reducing agents, ultraviolet absorbers, antioxidants, silane coupling agents, dyes, pH adjusting agents, surfactants, defoaming agents, thickeners, softening agents, lubricants, antistatic agents, etc.

A coating liquid for forming the protective layer containing the hydrophilic particles and the hydrophobic resin is preferably prepared by dissolving or dispersing the hydrophilic particles, the polyvalent isocyanate compound, the polyol compound, and an additive that can be added to the protective layer in a volatile aromatic and/or glycol component. The volatile aromatic component is a volatile component that has an aromatic ring, and specific examples thereof include benzene, toluene, o-xylene, m-xylene, p-xylene, ethylbenzene, trimethyl benzene, chlorobenzene, styrene, etc. The volatile glycol component is a volatile component that has a structure having an aliphatic hydrocarbon having two or more carbon atoms in which an oxygen atom is attached to each of two carbon atoms by a single bond. Specific examples of the volatile glycol component include ethylene glycol, propylene glycol, ethylene glycol monomethyl ether, ethylene glycol monoethyl ether, ethylene glycol monobutyl ether, ethylene glycol isopropyl ether, ethylene glycol monomethyl ether acetate, propylene glycol monomethyl ether, propylene glycol monoethyl ether, propylene glycol monomethyl ether acetate, ethylene glycol monoethyl ether acetate, etc. The volatile aromatic component is preferred among these, and toluene and o-xylene are more preferred because they contribute to good alcohol resistance. The volatile component may be a single type or in combination of two or more types depending on various purposes.

In a preferred embodiment, a high speed stirrer such as Homogenizing Disper is used to sufficiently disperse the hydrophilic particles in the coating liquid for forming the protective layer.

The protective layer containing the hydrophilic particles and the hydrophobic resin is formed by coating the coating liquid for forming the protective layer onto the thermal recording layer, and drying the coating liquid. The thickness of the protective layer is preferably 2.3 to 9.4 μm, and more preferably 2.3 to 6.8 μm. When the thickness of the protective layer containing the hydrophilic particles and the hydrophobic resin is less than 2.3 μm, ejected debris may be generated due to exposure to infrared laser radiation. When the thickness of the protective layer is more than 9.4 μm, a low contrast image may be formed after exposure to infrared laser radiation. The amount of the coating liquid for forming the protective layer to be coated onto the thermal recording layer may be adjusted as appropriate so that the desired thickness of the protective layer is obtained. The amount of the coating liquid for forming the protective layer coated onto the thermal recording layer in terms of dry mass is preferably 0.5 to 10 g/$m^2$, and more preferably 1.0 to 8.0 g/$m^2$.

The thickness of the protective layer can be determined by measuring the actual thickness of the protective layer by observing the cross section of the thermal recording material with a scanning electron microscope. When the hydrophilic particles protrude on the surface of the protective layer, the projections of the hydrophilic particles are excluded from the area where the actual thickness of the protective layer is measured in accordance with the invention.

The coating liquid for forming the infrared absorbing layer, the coating liquid for forming the thermal recording layer, and the coating liquid for forming the protective layer may be coated by any methods in accordance with the invention, and the coating methods may be selected from various coating methods as described in, for example, E. D. Cohen, E. B. Gutoff, "Modern Coating and Drying Technology", WILEY-VCH, Inc. New York, 1992. Coating methods capable of simultaneously coating multiple layers are preferred also for improving the productivity, including the slide coating method using a slit die coater, or the tandem coating method in which coating and drying are repeated using a combination of coater devices of the same or different types.

In addition to the infrared absorbing layer, the protective layer and the thermal recording layer, the thermal recording material of the invention may further contain as needed an easily adhesive layer, a heat insulating layer or other types of layers between the light-transmittable support and the infrared absorbing layer; an intermediate layer or other types of layers between each of the infrared absorbing layer and the thermal recording layer and the protective layer; an easily peelable layer or other types of layers on the protective layer; or an antistatic layer or other types of layers on the opposite side of the light-transmittable support from the side having the infrared absorbing layer, the thermal recording layer and the protective layer. Preferably the infrared absorbing layer resides adjacent to the thermal recording layer to form a high contrast image as described above.

An image can be formed by exposing the thermal recording material to an infrared laser beam projected in the form of the image from the protective layer side. The light source of the infrared laser beam may be, for example, a semiconductor laser, a He—Ne laser, an Ar laser, a carbon dioxide laser, an YAG laser, a fiber laser, etc. The thermal recording material of the invention is capable of forming image areas with different levels of density by changing the energy of the infrared laser beam irradiated on the thermal recording material and the exposure time. The infrared laser beam may be irradiated by using a thermal CTP platesetter, which is used for platemaking for flexographic printing or offset printing or for other purposes. Examples of the thermal CTP platesetter include AURA series (Guangzhou Amsky Technology Co., Ltd.), TRENDSETTER (registered trademark) series (Eastman Kodak Company), ACHIEVE (registered trademark) series (Eastman Kodak Company), etc.

After an image is formed by exposing the thermal recording material to an infrared laser beam using a thermal CTP platesetter or other devices, the UV transmission density and the visible light transmission density of the image area can be measured by using a transmission densitometer capable of measuring the transmission of ultraviolet and visible light. The UV transmission density is not measured on a surface where an image area co-exists with a non-image area in a narrow region, such as dots or narrow lines, but is preferably measured on a solid printing area of a size suitable for the light-receiving part of a transmission densitometer to obtain stable measured values. A transmission densitometer capable of measuring both of the UV transmission density and visible light transmission density may be, for example, X-Rite (registered trademark) 361T.

The thermal recording material of the invention on which an image has been formed in the manner as described above is suitable for use as a so-called printing plate material, which is a light-shielding masking material for making printing plates for flexographic printing or screen printing. The thermal recording material of the invention on which an image has been formed is also suitable for use as a photomask for photolithography, for example. The invention is not limited to these applications.

EXAMPLES

The present invention will be described with reference to Examples, but is not limited thereto. Various modifications and alterations are possible without departing from the technical scope of the present invention. In the Examples below, % is on a mass basis.

Example 1

Preparation of and Coating with Coating Liquid for Forming Infrared Absorbing Layer To 81 g of 2-butanone and 24 g of methanol were added 9.0 g of a polyvinyl butyral resin (Butvar (registered trademark) B-79, Eastman Chemical Japan Ltd.) and 0.45 g of the exemplary compound (5) (IRT manufactured by Showa Denko K.K., ε (830)/ε (365)=6.2) as an infrared absorbing dye to prepare a coating liquid for forming an infrared absorbing layer. The coating liquid for forming an infrared absorbing layer was coated onto a PET substrate of 100 μm in thickness (total light transmittance: 92%, haze value: 4%) so that the coating thickness after drying was 1.2 μm. The coated liquid was dried at 50° C. to form an infrared absorbing layer. The values of ε (830) and ε (365) were calculated from the absorption spectrum of a solution of the infrared absorbing dye in 2-butanone measured using an ultraviolet-visible spectrometer UV-2600 using a quartz cell with an optical path length of 1 cm (Shimadzu Corporation).

Preparation of Dispersion of Silver Behenate

To 175 g of 2-butanone were added 20 g of silver behenate crystals and 22 g of a polyvinyl butyral resin (Butvar B-79). The mixture was milled using a bead mill (DYNO-MILL KD 20 B, Willy A. Bachofen AG) loaded with zirconia beads of 0.65 mm in diameter to prepare a dispersion of silver behenate (mean particle size: 0.6 μm).

Preparation of and Coating with Coating Liquid for Forming Thermal Recording Layer To 45 g of 2-butanone were added 2.4 g of a polyvinyl butyral resin (Butvar B-79), 30 g of the dispersion of silver behenate prepared above, 1.5 g of ethyl 3,4-dihydroxybenzoate as a reducing agent, 0.6 g of tetrachlorophthalic anhydride and 1.2 g of phthalazone to prepare a coating liquid for forming a thermal recording layer. The coating liquid for forming a thermal recording layer was coated onto the infrared absorbing layer prepared above so that the amount of the liquid coated onto the layer expressed in terms of the amount of silver was 1.1 g/$m^2$. The coated liquid was dried at 80° C. to form a thermal recording layer. The amount of the silver halide contained in the thermal recording layer was less than 0.1% of the total solid content of the thermal recording layer.

Preparation of and Coating with Coating Liquid for Forming Protective Layer

To 15.0 g of 2-butanone was added 15.0 g of BEAMSET (registered trademark) 3702 (Arakawa Chemical Industries, Ltd.; a mixture containing an epoxy acrylate polymer, a polyfunctional acrylate compound and a photopolymerization initiator; solid content: 59%) as a photocurable resin to prepare 30 g of a coating liquid for forming a protective layer (the binder solid content of the coating liquid was 8.4 g). The coating liquid for forming a protective layer was coated onto the thermal recording layer prepared above so that the coating thickness after drying was 3.0 μm. The coated liquid was dried at 60° C. and the protective layer was cured by exposing it to a high-pressure mercury lamp at a radiation distance of 10 cm at a conveying speed of 5 m/min to prepare a thermal recording material of Example 1.

Example 2

A thermal recording material of Example 2 was prepared in the same manner as in Example 1 except that the coating liquid for forming an infrared absorbing layer was coated onto the PET substrate so that the coating thickness after drying was 1.5 μm in the preparation and coating steps of the coating liquid for forming an infrared absorbing layer.

Example 3

A thermal recording material of Example 3 was prepared in the same manner as in Example 1 except that the coating liquid for forming an infrared absorbing layer was coated onto the PET substrate so that the coating thickness after drying was 1.9 μm in the preparation and coating steps of the coating liquid for forming an infrared absorbing layer.

Example 4

A thermal recording material of Example 4 was prepared in the same manner as in Example 1 except that 9 g of a polyvinyl butyral resin (Butvar B-79) was added to 81 g of 2-butanone and 24 g of methanol to prepare a coating liquid for forming a protective layer and that the coating liquid for forming a protective layer was coated onto the thermal recording layer so that the coating thickness after drying was 1.6 μm in the preparation and coating steps of the coating liquid for forming a protective layer.

Example 5

A thermal recording material of Example 5 was prepared in the same manner as in Example 1 except that 0.45 g of the exemplary compound (1) (ε (830)/ε (365)=18.5) was added as an infrared absorbing dye in place of the exemplary compound (5) and that the coating liquid for forming an infrared absorbing layer was coated onto the PET substrate so that the coating thickness after drying was 1.5 μm in the preparation and coating steps of the coating liquid for forming an infrared absorbing layer.

Example 6

A thermal recording material of Example 6 was prepared in the same manner as in Example 1 except that 0.45 g of the exemplary compound (1) was added as an infrared absorbing dye in place of the exemplary compound (5) and that the coating liquid for forming an infrared absorbing layer was coated onto the PET substrate so that the coating thickness after drying was 2.3 μm in the preparation and coating steps of the coating liquid for forming an infrared absorbing layer.

Comparative Example 1

A thermal recording material of Comparative Example 1 was prepared in the same manner as in Example 1 except that the coating liquid for forming a thermal recording layer was coated onto the PET substrate of 100 μm in thickness (total light transmittance: 92%, haze value: 4%) without coating the PET substrate with the coating liquid for forming an infrared absorbing layer.

Comparative Example 2

A thermal recording material of Comparative Example 2 was prepared in the same manner as in Example 1 except that the coating liquid for forming a thermal recording layer was prepared with addition of 0.045 g of the exemplary compound (5) as an infrared absorbing dye and coated onto the PET substrate of 100 μm in thickness (total light transmittance: 92%, haze value: 4%) without coating the PET substrate with the coating liquid for forming an infrared absorbing layer in the preparation and coating steps of the coating liquid for forming a thermal recording layer.

Comparative Example 3

A thermal recording material of Comparative Example 3 was prepared in the same manner as in Example 1 except that the coating liquid for forming a thermal recording layer was coated onto the PET substrate of 100 μm in thickness (total light transmittance: 92%, haze value of 4%) without coating the PET substrate with the coating liquid for forming an infrared absorbing layer, and that the coating liquid for forming a protective layer was prepared by adding 9 g of a polyvinyl butyral resin (Butvar B-79) and 0.45 g of the exemplary compound (5) as an infrared absorbing dye to 81 g of 2-butanone and 24 g of methanol and was coated onto the thermal recording layer so that the coating thickness after drying was 1.6 μm in the preparation and coating steps of a coating liquid for forming a protective layer.

Comparative Example 4

A thermal recording material of Comparative Example 4 was prepared in the same manner as in Example 1 except that 0.07 g of IX-2-IR-14 (phthalocyanine dye, ε (830)/ε (365)=2.6, Nippon Shokubai Co., Ltd.) was added as an infrared absorbing dye in place of the exemplary compound (5) in the preparation and coating steps of the coating liquid for forming an infrared absorbing layer.

Formation of Images

The thermal recording materials produced in Examples 1 to 6 and Comparative Examples 1 to 4 were exposed to radiation using a thermal CTP platesetter (AURA600E, Guangzhou Amsky Technology Co., Ltd.) operated at a drum rotational speed of 300 rpm at an exposure power ranging from 200 mW to 800 mW to form an image containing 50 small dots of 20 μm in diameter (negatives) and a solid printing area (20 mm in width 200 mm in length).

Measurement of UV Transmission Density

The UV transmission density of the solid images and the non-image areas formed on the thermal recording materials of Examples 1 to 6 and Comparative Examples 1 to 4 was measured using X-Rite (registered trademark) 361T (X-Rite, Incorporated.) in UV mode. The exposure power (mW) at the maximum UV transmission density of each thermal recording material, and the UV transmission density of the solid images (Dmax) and the UV transmission density of the non-image areas (Dmin) are shown in Table 1.

Evaluation of Image Transfer Performance

Negative-working resin printing plates (TORELIEF (registered trademark) MF95DIIJ, 0.95 mm in thickness, Toray Industries, Inc.) were prepared using the thermal recording materials of Examples 1 to 6 and Comparative Examples 1 to 4 on which the images were formed as a masking film using a plate maker (Takano Processer DX-A4, Takano Machinery Works, Co. Ltd.) to evaluate the image transfer performance of the thermal recording materials. The evaluation results are shown in Table 1 below. In the table, Good indicates that 49 or more of the 50 small dots of 20 μm in diameter remained on the resin printing plate after platemaking. Fair indicates that 30 to 48 dots remained on the resin printing plate after platemaking. Poor indicates that 0 to 29 dots remained on the resin printing plate after platemaking.

TABLE 1

| | Exposure power | Dmax | Dmin | Dmax − Dmin | Image transfer performance |
|---|---|---|---|---|---|
| Example 1 | 600 | 4.12 | 0.12 | 4.00 | Good |
| Example 2 | 400 | 4.55 | 0.15 | 4.40 | Good |
| Example 3 | 300 | 4.25 | 0.19 | 4.06 | Good |
| Example 4 | 400 | 4.11 | 0.15 | 3.96 | Good |
| Example 5 | 600 | 4.55 | 0.16 | 4.39 | Good |
| Example 6 | 300 | 4.37 | 0.18 | 4.19 | Good |
| Comparative Example 1 | 800 | 0.09 | 0.09 | 0 | Poor |
| Comparative Example 2 | 600 | 1.23 | 0.12 | 1.11 | Poor |
| Comparative Example 3 | 600 | 2.63 | 0.17 | 2.46 | Fair |
| Comparative Example 4 | 800 | 2.88 | 0.18 | 2.70 | Fair |

The results shown in Table 1 demonstrate that thermal recording materials on which a high contrast image can be formed can be produced in accordance with the present invention.

On the contrary, in the thermal recording material of Comparative Example 1 lacking an infrared absorbing layer, the UV transmission density of the solid image (Dmax) is the same as the UV transmission density of the non-image area (Dmin).

In the thermal recording material of Comparative Example 2 containing the infrared absorbing dye in the thermal recording layer, the difference between the UV transmission density of the solid image (Dmax) and the UV transmission density of the non-image area (Dmin) is small, and a high contrast image could not be formed, and the image transfer performance was poor.

In the thermal recording material of Comparative Example 3 containing the infrared absorbing dye in the protective layer, the difference between the UV transmission density of the solid image (Dmax) and the UV transmission density of the non-image area (Dmin) is small, and a high contrast image could not be formed, and the image transfer performance was not good.

In the thermal recording material of Comparative Example 4 having the infrared absorbing layer containing the infrared absorbing dye with a ratio of ε (830)/ε (365) of 2.6, the difference between the UV transmission density of the solid image (Dmax) and the UV transmission density of the non-image area (Dmin) is small, and a high contrast image could not be formed, and the image transfer performance was not good.

Example 7

Preparation of and Coating with Coating Liquid for Forming Infrared Absorbing Layer To 81 parts by mass of 2-butanone and 24 parts by mass of methanol were added 9.0 parts by mass of a polyvinyl butyral resin (Butvar (registered trademark) B-79, Eastman Chemical Japan Ltd.), 0.45 parts by mass of the exemplary compound (5) (IRT manufactured by Showa Denko K.K., ε (830)/ε (365)=6.2) as an infrared absorbing dye and 1.5 parts by mass of 4-methylcatechol as a reducing agent to prepare a coating liquid for forming an infrared absorbing layer. The coating liquid for forming an infrared absorbing layer was coated onto a PET substrate of 100 μm in thickness (total light transmittance: 92%, haze value: 4%) using a small-diameter gravure coater so that the dry mass was 1.5 $g/m^2$. The coated liquid was dried at 50° C. to form an infrared absorbing layer. The gravure roll had a pitch of 90 lines/inch, an angle of lines of 45 degrees and a groove depth of 100 μm. The coating speed was 20 m/min.

Preparation of Dispersion of Silver Behenate

To 175 parts by mass of 2-butanone were added 20 parts by mass of silver behenate crystals and 22 parts by mass of a polyvinyl butyral resin (Butvar B-79). The mixture was milled using a bead mill (DYNO-MILL KD 20 B, Willy A. Bachofen AG) loaded with zirconia beads of 0.65 mm in diameter to prepare a dispersion of silver behenate (mean particle size: 0.6 μm).

Preparation of and Coating with Coating Liquid for Forming Thermal Recording Layer To 45 parts by mass of 2-butanone were added 2.4 parts by mass of a polyvinyl butyral resin (Butvar B-79), 30 parts by mass of the dispersion of silver behenate prepared above, 1.5 parts by mass of ethyl 3,4-dihydroxybenzoate as a reducing agent, 0.6 parts by mass of tetrachlorophthalic anhydride and 1.2 parts by mass of phthalazone to prepare a coating liquid for forming a thermal recording layer. The coating liquid for forming a thermal recording layer was coated onto the above-prepared infrared absorbing layer using a die coater so that the amount of the liquid coated onto the layer expressed in terms of the amount of silver was 1.3 $g/m^2$. The coated liquid was dried at 80° C. to form a thermal recording layer. The coating speed was 20 m/min. The amount of the silver halide contained in the thermal recording layer was less than 0.1% of the total solid content of the thermal recording layer.

Preparation of and Coating with Coating Liquid for Forming Protective Layer

To 15.0 parts by mass of 2-butanone was added 15.0 parts by mass of BEAMSET (registered trademark) 3702 (Arakawa Chemical Industries, Ltd.; a mixture containing an epoxy acrylate polymer, a polyfunctional acrylate compound and a photopolymerization initiator; solid content: 59%) as a photocurable resin to prepare 30 parts by mass of a coating liquid for forming a protective layer (the binder solid content of the coating liquid was 8.4 parts by mass). The coating liquid for forming a protective layer was coated onto the thermal recording layer using a small-diameter gravure coater so that the dry mass was 5.0 $g/m^2$. The coated liquid was dried at 60° C. and the protective layer was cured by exposing it to a high-pressure mercury lamp to prepare a thermal recording material of Example 7. The gravure roll had a pitch of 90 lines/inch, an angle of lines of 45 degrees and a groove depth of 100 μm. The coating speed was 10 m/min.

Example 8

A thermal recording material of Example 8 was prepared in the same manner as in Example 7 except that 1.5 parts by mass of 4-tert-butylcatechol was added as a reducing agent in place of 4-methylcatechol in the preparation and coating steps of the coating liquid for forming an infrared absorbing layer.

Example 9

A thermal recording material of Example 9 was prepared in the same manner as in Example 7 except that 1.5 parts by mass of methyl gallate was added as a reducing agent in place of 4-methylcatechol in the preparation and coating steps of the coating liquid for forming an infrared absorbing layer.

Example 10

A thermal recording material of Example 10 was prepared in the same manner as in Example 7 except that 1.5 parts by mass of ethyl 3,4-dihydroxybenzoate was added as a reducing agent in place of 4-methylcatechol in the preparation and coating steps of the coating liquid for forming an infrared absorbing layer.

Example 11

A thermal recording material of Example 11 was prepared in the same manner as in Example 7 except that 1.5 parts by mass of ascorbyl palmitate was added as a reducing agent in place of 4-methylcatechol in the preparation and coating steps of the coating liquid for forming an infrared absorbing layer.

Example 12

A thermal recording material of Example 12 was prepared in the same manner as in Example 7 except that 0.45 parts by mass of the exemplary compound (1) (ε (830)/ε (365) =18.5) was added as an infrared absorbing dye in place of the exemplary compound (5) in the preparation and coating steps of the coating liquid for forming an infrared absorbing layer.

Comparative Example 5

A thermal recording material of Comparative Example 5 was prepared in the same manner as in Example 7 except that the coating liquid for forming a thermal recording layer was coated onto the PET substrate of 100 μm in thickness (total light transmittance: 92%, haze value: 4%) without coating the PET substrate with the coating liquid for forming an infrared absorbing layer.

Comparative Example 6

A thermal recording material of Comparative Example 6 was prepared in the same manner as in Example 7 except that the infrared absorbing dye was not added to the coating liquid for forming an infrared absorbing layer in the preparation and coating steps of the coating liquid for forming an infrared absorbing layer.

Comparative Example 7

A thermal recording material of Comparative Example 7 was prepared in the same manner as in Example 7 except that the reducing agent was not added to the coating liquid for forming an infrared absorbing layer in the preparation and coating steps of the coating liquid for forming an infrared absorbing layer.

Comparative Example 8

A thermal recording material of Comparative Example 8 was prepared in the same manner as in Example 7 except that 0.07 parts by mass of IX-2-IR-14 (phthalocyanine dye, ε (830)/ε (365)=2.6, Nippon Shokubai Co., Ltd.) was added as an infrared absorbing dye in place of the exemplary compound (5), and that the reducing agent was not added to the coating liquid for forming an infrared absorbing layer in the preparation and coating steps of the coating liquid for forming an infrared absorbing layer.

Comparative Example 9

A thermal recording material of Comparative Example 9 was prepared in the same manner as in Example 7 except that 0.07 parts by mass of IX-2-IR-14 (phthalocyanine dye, ε (830)/ε (365)=2.6, Nippon Shokubai Co., Ltd.) was added as an infrared absorbing dye in place of the exemplary compound (5) in the preparation and coating steps of the coating liquid for forming an infrared absorbing layer.

Formation of Images

The thermal recording materials produced in Examples 7 to 12 and Comparative Examples 5 to 9 were exposed to radiation using a thermal CTP platesetter (AURA600E, Guangzhou Amsky Technology Co., Ltd.) operated at a drum rotational speed of 300 rpm at an exposure power ranging from 200 mW to 800 mW to form 50 small dots of 20 μm in diameter (negatives) and solid images (a set of ten images with a size of 20 mm in width×200 mm in length).

Measurement of UV Transmission Density

The UV transmission density of the solid images and the non-image areas formed on the thermal recording materials of Examples 7 to 12 and Comparative Examples 5 to 9 was measured using X-Rite (registered trademark) 361T (X-Rite, Incorporated.) in UV mode. The exposure power (mW) at the maximum UV transmission density of each thermal recording material, and the UV transmission density of the solid images (Dmax) and the UV transmission density of the non-image areas (Dmin) are shown in Table 2.

Evaluation of Image Transfer Performance

Negative-working resin printing plates (TORELIEF (registered trademark) MF95DIIJ, 0.95 mm in thickness, Toray Industries, Inc.) were prepared using the thermal recording materials of Examples 7 to 12 and Comparative Examples 5 to 9 on which the images were formed as a masking film using a plate maker (Takano Processer DX-A4, Takano Machinery Works, Co. Ltd.) to evaluate the image transfer performance of the thermal recording materials. The evaluation results are shown in Table 2 below. In the table, Good indicates that 49 or more of the 50 small dots of 20 μm in diameter remained on the resin printing plate after platemaking. Fair indicates that 30 to 48 dots remained on the resin printing plate after platemaking. Poor indicates that 0 to 29 dots remained on the resin printing plate after platemaking.

Evaluation of the Number of Pinholes

The thermal recording materials of Examples 7 to 12 and Comparative Examples 5 to 9 on which the images were formed were placed on a light table, and visually recognizable pinholes on the solid images (a set of ten images for each material) were counted. The evaluation results are shown in Table 2. In the table, Excellent indicates that 0 to 2 pinholes were observed; Good indicates that 3 to 7 pinholes were observed; and Fair indicates that 8 or more pinholes were observed.

TABLE 2

| | Exposure power | Dmax | Dmin | Dmax − Dmin | Image transfer performance | Evaluation of number of pinholes |
|---|---|---|---|---|---|---|
| Example 7 | 400 | 4.59 | 0.14 | 4.45 | Good | Excellent |
| Example 8 | 400 | 4.64 | 0.15 | 4.49 | Good | Excellent |
| Example 9 | 400 | 4.62 | 0.15 | 4.47 | Good | Excellent |
| Example 10 | 400 | 4.60 | 0.14 | 4.46 | Good | Excellent |
| Example 11 | 400 | 4.62 | 0.15 | 4.47 | Good | Good |
| Example 12 | 400 | 4.60 | 0.15 | 4.45 | Good | Excellent |
| Comparative Example 5 | 800 | 0.09 | 0.09 | 0 | Poor | Not able to be assessed |
| Comparative Example 6 | 800 | 0.10 | 0.09 | 0.01 | Poor | Not able to be assessed |
| Comparative Example 7 | 400 | 4.61 | 0.15 | 4.46 | Good | Fair |
| Comparative Example 8 | 800 | 2.92 | 0.18 | 2.74 | Fair | Good |
| Comparative Example 9 | 800 | 2.95 | 0.19 | 2.76 | Fair | Excellent |

The results shown in Table 2 demonstrate that thermal recording materials on which a high contrast image can be formed by exposure to infrared laser radiation and in which the occurrence of pinholes is reduced can be produced in accordance with the present invention.

On the contrary, in the thermal recording material of Comparative Example 5 lacking an infrared absorbing layer, the UV transmission density of the solid image (Dmax) is the same as the UV transmission density of the non-image area (Dmin), and the number of pinholes was not able to be assessed.

In the thermal recording material of Comparative Example 6 having the infrared absorbing layer that lacks an infrared absorbing dye, the UV transmission density of the solid image (Dmax) is just slightly different from the UV transmission density of the non-image area (Dmin), and the number of pinholes was not able to be assessed.

The thermal recording material of Comparative Example 7 having the infrared absorbing layer that lacks a reducing agent showed a large number of pinholes.

In the thermal recording materials of Comparative Examples 8 and 9 having the infrared absorbing layer containing the infrared absorbing dye with a ratio of ε (830)/ε (365) of 2.6, the difference between the UV transmission density of the solid image (Dmax) and the UV transmission density of a non-image area (Dmin) is small, and a high contrast image could not be formed, and the image transfer performance was not good.

Example 13

Preparation of and Coating with Coating Liquid for Forming Infrared Absorbing Layer To 81.0 g of 2-butanone and 24.0 g of methanol were added 9.0 g of polyvinyl butyral (Butvar (registered trademark) B-79, Eastman Chemical Japan Ltd.) and 0.45 g of the exemplary compound (5) (IRT manufactured by Showa Denko K.K., ε (830)/ε (365)=6.2) as an infrared absorbing dye to prepare a coating liquid for forming an infrared absorbing layer. The coating liquid for forming an infrared absorbing layer was coated onto a PET substrate of 100 μm in thickness (total light transmittance: 92%, haze value: 4%) using a wire bar so that the dry mass was 1.0 g/$m^2$. The coated liquid was dried at 60° C. for 1 minute to form an infrared absorbing layer.

Preparation of Dispersion of Silver Behenate

To 175 g of 2-butanone were added 20.0 g of silver behenate crystals and 22 g of polyvinyl butyral (Butvar B-79). The mixture was milled using a bead mill (DYNO-MILL KD 20 B, Willy A. Bachofen AG) loaded with zirconia beads of 0.65 mm in diameter to prepare a dispersion of silver behenate (mean particle size: 0.8 μm).

Preparation of and Coating with Coating Liquid for Forming Thermal Recording Layer To 45.0 g of 2-butanone were added 4.2 g of polyvinyl butyral (Butvar B-79), 91.2 g of the dispersion of silver behenate prepared above, 5.0 g of ethyl 3,4-dihydroxybenzoate as a reducing agent, 0.1 g of tetrachlorophthalic anhydride and 1.9 g of phthalazone to prepare a coating liquid for forming a thermal recording layer. The coating liquid for forming a thermal recording layer was coated onto the above-prepared infrared absorbing layer using a wire bar so that the amount of the liquid coated onto the layer expressed in terms of the amount of silver was 1.1 g/$m^2$. The coated liquid was dried at 80° C. for 3 minutes to form a thermal recording layer.

Preparation of and Coating with Coating Liquid for Forming Protective Layer

To 25.7 g of toluene were added 15.2 g of ACRYDIC WBU-1218 (acrylic polyol solution, solid content: 30% by mass; DIC Corporation) and 0.35 g of SEAHOSTAR KE-P250 (hydrophilic silica particles, mean particle size: 2.5 μm; Nippon Shokubai Co., Ltd.). The mixture was stirred into a homogeneous mixture, and 12 g of CORONATE 2715 (modified polyisocyanate solution, solid content: 90% by mass; Tosoh Corporation) was added with stirring to prepare a coating liquid for forming a protective layer. The coating liquid for forming a protective layer was coated onto the thermal recording layer using a wire bar, and dried at 80° C. for 3 minutes and then heated at 40° C. for five days to form a protective layer. In this manner, a thermal recording material of Example 13 was obtained. The cross section of the thermal recording material of Example 13 was observed with a scanning electron microscope to measure the thickness of the protective layer which was found to be 4.0 μm.

Example 14

A thermal recording material of Example 14 was prepared in the same manner as in Example 13 except that the amount of the coated coating liquid for forming a protective layer was changed so that the thickness of the protective layer was 2.7 μm in the preparation and coating steps of the coating liquid for forming a protective layer.

Example 15

A thermal recording material of Example 15 was prepared in the same manner as in Example 13 except that the amount of the coated coating liquid for forming a protective layer was changed so that the thickness of the protective layer was 5.5 μm in the preparation and coating steps of the coating liquid for forming a protective layer.

Example 16

A thermal recording material of Example 16 was prepared in the same manner as in Example 13 except that the amount of the coated coating liquid for forming a protective layer was changed so that the thickness of the protective layer was 8.1 μm in the preparation and coating steps of the coating liquid for forming a protective layer.

Example 17

A thermal recording material of Example 17 was prepared in the same manner as in Example 13 except that 0.35 g of SYLYSIA 430 (hydrophilic silica particles, mean particle size: 4.1 μm; Fuji Silysia Chemical Ltd.) was added in place of SEAHOSTAR KE-P250 in the preparation and coating steps of the coating liquid for forming a protective layer. The thickness of the protective layer was 4.0 μm.

Example 18

A thermal recording material of Example 18 was prepared in the same manner as in Example 13 except that 0.35 g of SYLYSIA 450 (hydrophilic silica particles, mean particle size: 8.0 μm; Fuji Silysia Chemical Ltd.) was added in place of SEAHOSTAR KE-P250 in the preparation and coating steps of the coating liquid for forming a protective layer. The thickness of the protective layer was 4.2 μm.

Example 19

A thermal recording material of Example 19 was prepared in the same manner as in Example 13 except that 0.35 g of SUNSPHERE NP-30 (hydrophilic silica particles, mean particle size: 4.0 μm; AGC Si-Tech Co., Ltd.) was added in place of SEAHOSTAR KE-P250 in the preparation and coating steps of the coating liquid for forming a protective layer. The thickness of the protective layer was 4.0 μm.

Example 20

A thermal recording material of Example 20 was prepared in the same manner as in Example 13 except that 0.35 g of SUNSPHERE H-121 (hydrophilic silica particles, mean particle size: 12 μm; AGC Si-Tech Co., Ltd.) was added in place of SEAHOSTAR KE-P250 in the preparation and coating steps of the coating liquid for forming a protective layer. The thickness of the protective layer was 4.9 μm.

Example 21

A thermal recording material of Example 21 was prepared in the same manner as in Example 13 except that 0.35 g (in terms of a solid content) of ORGANOSILICASOL IPA-ST-ZL (a dispersion of hydrophilic silica particles in 2-propanol, solid content: 30% by mass, mean particle size: 0.08 μm; Nissan Chemical Corporation) was added in place of SEAHOSTAR KE-P250 in the preparation and coating steps of the coating liquid for forming a protective layer. The thickness of the protective layer was 3.8 μm.

Example 22

A thermal recording material of Example 22 was prepared in the same manner as in Example 13 except that 0.35 g of Milled Alumina SA31B (hydrophilic alumina particles, mean particle size: 4.0 μm; Nippon Light Metal Co., Ltd.) was added in place of SEAHOSTAR KE-P250 in the preparation and coating steps of the coating liquid for forming a protective layer. The thickness of the protective layer was 4.0 μm.

Example 23

A thermal recording material of Example 23 was prepared in the same manner as in Example 13 except that 0.35 g of Chemisnow MX500 (hydrophilic acrylic particles, mean particle size: 5.0 μm: Soken Chemical & Engineering Co., Ltd.) was added in place of SEAHOSTAR KE-P250 in the preparation and coating steps of the coating liquid for forming a protective layer. The thickness of the protective layer was 4.1 μm.

Example 24

A thermal recording material of Example 24 was prepared in the same manner as in Example 13 except that 0.35 g of OPTBEADS 3500M (hydrophilic melamine particles, mean particle size: 3.5 μm; Nissan Chemical Corporation) was added in place of SEAHOSTAR KE-P250 in the preparation and coating steps of the coating liquid for forming a protective layer. The thickness of the protective layer was 4.0 μm.

Example 25

A thermal recording material of Example 25 was prepared in the same manner as in Example 13 except that the coating liquid for forming a protective layer was prepared by dissolving 1.0 g of a cellulose acetate resin in 9.0 g of 2-butanone, then adding 0.025 g of SEAHOSTAR KE-P250 and stirring the mixture into a homogeneous mixture, and that the coating liquid for forming a protective layer was coated onto the thermal recording layer using a wire bar and dried at 80° C. for 3 minutes to form a protective layer. The thickness of the protective layer was 3.7 μm.

Example 26

A thermal recording material of Example 26 was prepared in the same manner as in Example 13 except that the coating liquid for forming a protective layer was prepared by dissolving 1.0 g (in terms of a solid content) of ACRYDIC WDL-787 (acrylic resin solution, solid content: 40% by mass; DIC Corporation) in 9.0 g of 2-butanone, then adding 0.025 g of SEAHOSTAR KE-P250 and stirring the mixture into a homogeneous mixture, and that the coating liquid for forming a protective layer was coated onto the thermal recording layer using a wire bar and dried at 80° C. for 3 minutes to form a protective layer. The thickness of the protective layer was 3.8 μm.

Example 27

A thermal recording material of Example 27 was prepared in the same manner as in Example 13 except that the amount of SEAHOSTAR KE-P250 was changed to 0.27 g in the preparation and coating steps of the coating liquid for forming a protective layer. The thickness of the protective layer was 4.0 μm.

Example 28

A thermal recording material of Example 28 was prepared in the same manner as in Example 13 except that the amount of SEAHOSTAR KE-P250 was changed to 0.22 g in the preparation and coating steps of the coating liquid for forming a protective layer. The thickness of the protective layer was 4.1 μm.

Example 29

A thermal recording material of Example 29 was prepared in the same manner as in Example 13 except that the amount of SEAHOSTAR KE-P250 was changed to 0.15 g in the preparation and coating steps of the coating liquid for forming a protective layer. The thickness of the protective layer was 4.0 μm.

Example 30

A thermal recording material of Example 30 was prepared in the same manner as in Example 13 except that 0.45 g of the exemplary compound (1) (ε (830)/ε (365)=18.5) was added as an infrared absorbing dye in place of the exemplary compound (5) in the preparation step of the coating liquid for forming an infrared absorbing layer. The thickness of the protective layer was 3.9 μm.

Comparative Example 10

A thermal recording material of Comparative Example 10 was prepared in the same manner as in Example 13 except that the amount of the coated coating liquid for forming a protective layer was changed so that the thickness of the protective layer was 1.9 μm in the preparation and coating steps of the coating liquid for forming a protective layer.

Comparative Example 11

A thermal recording material of Comparative Example 11 was prepared in the same manner as in Example 13 except that the amount of the coated coating liquid for forming a protective layer was changed so that the thickness of the protective layer was 10.7 μm in the preparation and coating steps of the coating liquid for forming a protective layer.

Comparative Example 12

A thermal recording material of Comparative Example 12 was prepared in the same manner as in Example 13 except that 0.35 g of SYLOPHOBIC (registered trademark) 200 (hydrophobic silica particles, mean particle size: 3.9 μm; Fuji Silysia Chemical Ltd.) was added in place of SEAHOSTAR KE-P250 in the preparation and coating steps of the coating liquid for forming a protective layer. The thickness of the protective layer was 3.9 μm.

Comparative Example 13

A thermal recording material of Comparative Example 13 was prepared in the same manner as in Example 13 except that the coating liquid for forming a protective layer was prepared by dissolving 1.0 g of Kuraray Poval 60-80 (polyvinyl alcohol, hydrophilic resin; Kuraray Co., Ltd.) in 18.0 g of water, adding 0.025 g of SEAHOSTAR KE-P250 and then stirring the mixture into a homogeneous mixture, and adding 0.05 g of boric acid under stirring, and that the coating liquid for forming a protective layer was coated onto the thermal recording layer using a wire bar and dried at 80° C. for 3 minutes to form a protective layer. The thickness of the protective layer was 4.0 μm.

Comparative Example 14

A thermal recording material of Comparative Example 14 was prepared in the same manner as in Example 13 except that SEAHOSTAR KE-P was not added in the preparation and coating steps of the coating liquid for forming a protective layer. The thickness of the protective layer was 3.9 μm.

Comparative Example 15

A thermal recording material of Comparative Example 15 was prepared in the same manner as in Example 13 except that 0.07 g of IX-2-IR-14 (ε (830)/ε (365)=2.6, Nippon Shokubai Co., Ltd.) was added as an infrared absorbing dye in place of the exemplary compound (5) in the preparation and coating steps of the coating liquid for forming an infrared absorbing layer. The thickness of the protective layer was 3.9 μm.

Formation of Images

The thermal recording materials produced in Examples 13 to 30 and Comparative Examples 10 to 15 were exposed to infrared laser beams using a thermal CTP platesetter (AURA600E, Guangzhou Amsky Technology Co., Ltd.) to form a solid image of 4000 dpi (20 mm in width×200 mm in length). The thermal CTP platesetter was operated at a fixed drum rotational speed of 300 rpm at a laser power of 300 mW.

Measurement of UV Transmission Density

The UV transmission density of the solid images and the non-image areas on the thermal recording materials of Examples 13 to 30 and Comparative Examples 10 to 15 was measured using X-Rite (registered trademark) 361T (X-Rite, Incorporated.) in UV mode to determine the UV transmission density of the solid images (Dmax) and the UV transmission density of the non-image areas (Dmin). The calculation results from the formula Dmax−Dmin, which indicates the difference between Dmax and Dmin, are shown in Table 3 below.

Evaluation of Ejected Debris

The surrounding area of the image area formed on each of the thermal recording materials of Examples 13 to 30 and Comparative Examples 10 to 15 was observed by naked eyes and under a microscope (at a magnification of 50 times) to determine whether ejected debris generated from the surface of the thermal recording material contaminated the surrounding area of the image area. The ejected debris was evaluated by the criteria for evaluation of ejected debris below and the results are shown in Table 3 below.

Criteria for Evaluation of Ejected Debris

- Excellent: there was no recognizable contamination by ejected debris.
- Good: a negligible amount of ejected debris was observed in the surrounding area of the image area (ejected debris could not be observed by naked eyes, but could be observed under a microscope).
- Fair: ejected debris was observed by naked eyes in the surrounding area of the image area, but the thermal recording material has no problems for practical use.
- Poor: a large amount of ejected debris accumulated in the surrounding area of the image area, and the thermal recording material was not appropriate for practical use.

TABLE 3

| | Dmax − Dmin | Evaluation of ejected debris |
|---|---|---|
| Example 13 | 3.65 | Excellent |
| Example 14 | 3.71 | Excellent |
| Example 15 | 3.59 | Excellent |
| Example 16 | 3.21 | Excellent |
| Example 17 | 3.54 | Excellent |
| Example 18 | 3.51 | Excellent |
| Example 19 | 3.58 | Excellent |
| Example 20 | 3.33 | Excellent |
| Example 21 | 3.58 | Good |
| Example 22 | 3.55 | Excellent |
| Example 23 | 3.52 | Good |
| Example 24 | 3.52 | Good |
| Example 25 | 3.52 | Good |
| Example 26 | 3.54 | Good |
| Example 27 | 3.55 | Excellent |
| Example 28 | 3.57 | Good |
| Example 29 | 3.58 | Fair |
| Example 30 | 3.82 | Excellent |
| Comparative Example 10 | 3.82 | Poor |
| Comparative Example 11 | 2.67 | Excellent |
| Comparative Example 12 | 3.55 | Poor |
| Comparative Example 13 | 3.55 | Poor |
| Comparative Example 14 | 3.61 | Poor |
| Comparative Example 15 | 2.04 | Excellent |

The results shown in Table 3 demonstrate that thermal recording materials on which a high contrast image can be formed by exposure to infrared laser radiation and in which the generation of ejected debris from the surface of the thermal recording materials due to infrared laser radiation is reduced can be produced in accordance with the present invention.

On the contrary, in the thermal recording material of Comparative Example 10 having the protective layer with a small thickness, a large amount of ejected debris was generated around the image area.

In the thermal recording material of Comparative Example 11 having the protective layer with a large thickness, the difference between the UV transmission density of the solid image (Dmax) and the UV transmission density of the non-image area (Dmin) is small, and a high contrast image could not be formed.

In the thermal recording material of Comparative Example 12 having the protective layer not containing hydrophilic silica particles but containing hydrophobic silica particles and the hydrophobic resin, a large amount of ejected debris was generated around the image area.

In the thermal recording material of Comparative Example 13 having the protective layer not containing a hydrophobic resin but containing hydrophilic silica particles and the hydrophilic resin, a large amount of ejected debris was generated around the image area.

In the thermal recording material of Comparative Example 14 having the protective layer not containing hydrophilic silica particles but containing the hydrophobic resin only, a large amount of ejected debris was generated around the image area.

In the thermal recording material of Comparative Example 15 having the infrared absorbing layer containing the infrared absorbing dye with a ratio of ε (830)/ε (365) of 2.6, the difference between the UV transmission density of the solid image (Dmax) and the UV transmission density of the non-image area (Dmin) is small, and a high contrast image could not be formed.

Example 31

Preparation of and Coating with Coating Liquid for Forming Infrared Absorbing Layer To 81.0 g of 2-butanone and 24.0 g of methanol were added 9.0 g of polyvinyl butyral (Butvar (registered trademark) B-79, Eastman Chemical Japan Ltd.) and 0.45 g of the exemplary compound (5) (IRT manufactured by Showa Denko K.K., ε1/ε2=6.2) as an infrared absorbing dye to prepare a coating liquid for forming an infrared absorbing layer. The coating liquid for forming an infrared absorbing layer was coated onto a polyethylene terephthalate film substrate of 100 μm in thickness (total light transmittance: 92%, haze value: 4%) using a wire bar so that the dry mass was 1.0 g/$m^2$. The coated liquid was dried at 60° C. for 1 minute to form an infrared absorbing layer.

Preparation of Dispersion of Silver Behenate

To 175 g of 2-butanone were added 22.0 g of silver behenate crystals and 22.0 g of polyvinyl butyral (Butvar B-79). The mixture was dispersed using a bead mill (DYNO-MILL KD 20 B, Willy A. Bachofen AG) loaded with zirconia beads of 0.65 mm in diameter to prepare a dispersion of silver behenate (mean particle size: 0.8 μm).

Preparation of and Coating with Coating Liquid for Forming Thermal Recording Layer To 45.0 g of 2-butanone were added 4.2 g of polyvinyl butyral (Butvar B-79), 91.2 g of the dispersion of silver behenate prepared above, 5.0 g of ethyl 3,4-dihydroxybenzoate as a reducing agent, 0.1 g of tetrachlorophthalic anhydride, 1.9 g of phthalazone and 0.40 g of fumaric acid to prepare a coating liquid for forming a thermal recording layer. The coating liquid for forming a thermal recording layer was coated onto the above-prepared infrared absorbing layer using a wire bar so that the amount of the liquid coated onto the layer expressed in terms of the amount of silver was 1.1 g/m$^2$. The coated liquid was dried at 80° C. for 3 minutes to form a thermal recording layer.

Preparation of and Coating with Coating Liquid for Forming Protective Layer

To 25.7 g of toluene were added 11.4 g of ACRYDIC (registered trademark) WFU-289 (acrylic polyol resin; DIC Corporation) and 0.30 g of SEAHOSTAR (registered trademark) KE-P250 (silica particles, mean particle size: 2.5 μm; Nippon Shokubai Co., Ltd.). The mixture was stirred into a homogeneous mixture, and 14 g of CORONATE HL (polyisocyanate; Tosoh Corporation) was added with stirring to prepare a coating liquid for forming a protective layer. The coating liquid for forming a protective layer was coated onto the thermal recording layer using a wire bar so that the dry mass was 1.5 g/m$^2$, and dried at 80° C. for 3 minutes and then heated at 40° C. for five days to form a protective layer. In this manner, a thermal recording material of Example 31 was obtained.

Example 32

A thermal recording material of Example 32 was prepared in the same manner as in Example 31 except that the amount of fumaric acid added for preparation of the coating liquid for forming a thermal recording layer was changed to 1.2 g in the preparation and coating steps of the coating liquid for forming a thermal recording layer.

Example 33

A thermal recording material of Example 33 was prepared in the same manner as in Example 31 except that the coating liquid for forming a thermal recording layer was prepared by adding 0.57 g of isophthalic acid in place of fumaric acid in the preparation and coating steps of the coating liquid for forming a thermal recording layer.

Example 34

A thermal recording material of Example 34 was prepared in the same manner as in Example 31 except that the coating liquid for forming a thermal recording layer was prepared by adding 0.63 g of 4-hydroxyisophthalic acid in place of fumaric acid in the preparation and coating steps of the coating liquid for forming a thermal recording layer.

Example 35

A thermal recording material of Example 35 was prepared in the same manner as in Example 31 except that the coating liquid for forming a thermal recording layer was prepared by adding 0.68 g of 5-methoxyisophthalic acid in place of fumaric acid in the preparation and coating steps of the coating liquid for forming a thermal recording layer.

Example 36

A thermal recording material of Example 36 was prepared in the same manner as in Example 31 except that the coating liquid for forming a thermal recording layer was prepared by adding 0.62 g of 2-methylterephthalic acid in place of fumaric acid in the preparation and coating steps of the coating liquid for forming a thermal recording layer.

Example 37

A thermal recording material of Example 37 was prepared in the same manner as in Example 31 except that the coating liquid for forming a thermal recording layer was prepared by adding 0.41 g of succinic acid in place of fumaric acid in the preparation and coating steps of the coating liquid for forming a thermal recording layer.

Example 38

A thermal recording material of Example 38 was prepared in the same manner as in Example 31 except that the coating liquid for forming a thermal recording layer was prepared by adding 0.50 g of adipic acid in place of fumaric acid in the preparation and coating steps of the coating liquid for forming a thermal recording layer.

Example 39

A thermal recording material of Example 39 was prepared in the same manner as in Example 31 except that the coating liquid for forming a thermal recording layer was prepared by adding 0.60 g of suberic acid in place of fumaric acid in the preparation and coating steps of the coating liquid for forming a thermal recording layer.

Example 40

A thermal recording material of Example 40 was prepared in the same manner as in Example 31 except that the coating liquid for forming a thermal recording layer was prepared by further adding 0.57 g of isophthalic acid in addition to 0.40 g of fumaric acid in the preparation and coating steps of the coating liquid for forming a thermal recording layer.

Comparative Example 16

A thermal recording material of Comparative Example 16 was prepared in the same manner as in Example 31 except that the coating liquid for forming a thermal recording layer was prepared without addition of fumaric acid in the preparation and coating steps of the coating liquid for forming a thermal recording layer.

Comparative Example 17

A thermal recording material of Comparative Example 17 was prepared in the same manner as in Example 31 except that the coating liquid for forming a thermal recording layer was prepared by adding 0.40 g of maleic acid in place of fumaric acid in the preparation and coating steps of the coating liquid for forming a thermal recording layer.

Comparative Example 18

A thermal recording material of Comparative Example 18 was prepared in the same manner as in Example 31 except that the coating liquid for forming a thermal recording layer was prepared by adding 0.57 g of phthalic acid in place of fumaric acid in the preparation and coating steps of the coating liquid for forming a thermal recording layer.

Comparative Example 19

A thermal recording material of Comparative Example 19 was prepared in the same manner as in Example 31 except that the coating liquid for forming a thermal recording layer was prepared by adding 0.36 g of malonic acid in place of fumaric acid in the preparation and coating steps of the coating liquid for forming a thermal recording layer.

Comparative Example 20

A thermal recording material of Comparative Example 20 was prepared in the same manner as in Example 31 except that the coating liquid for forming a thermal recording layer was prepared by adding 0.70 g of sebacic acid in place of fumaric acid in the preparation and coating steps of the coating liquid for forming a thermal recording layer.

Formation of Images

The thermal recording materials produced in Examples 31 to 40 and Comparative Examples 16 to 20 were exposed to infrared laser beams using a thermal CTP platesetter (AURA600E, Guangzhou Amsky Technology Co., Ltd.) to form a solid image (20 mm in width×200 mm in length). The thermal CTP platesetter was operated at a fixed drum rotational speed of 300 rpm at varying laser powers, including 200 mW, 240 mW, 300 mW and 400 mW. Four solid images per material were formed for each laser power.

Measurement of UV Transmission Density and Visible Light Transmission Density

The UV transmission density and visible light transmission density of the non-image areas and the four image areas formed using the varying laser powers on the thermal recording materials of Examples 31 to 40 and Comparative Examples of 16 to 20 were measured using X-Rite (registered trademark) 361T (X-Rite, Incorporated.) in UV mode and in visible light mode, respectively. Tables 4 and 5 show the values calculated from the formula Dmax−Dmin, which indicates the difference between the UV transmission density of the solid image (Dmax) and the UV transmission density of the non-image area (Dmin) on each thermal recording material, and also show the UV transmission density and the visible light transmission density measured at a laser power of 200 mW, 240 mW, 300 mW or 400 mW.

When the value calculated from the formula Dmax−Dmin is 3.00 or more, the thermal recording material is defined herein as a thermal recording material on which a high contrast image can be formed. The dose of the infrared laser radiation can be optimized by referring to the visible light transmission density. For example, the visible light transmission density of a thermal recording material at which the value calculated from the formula Dmax−Dmin, which indicates the difference between the UV transmission density of an image (Dmax) and the UV transmission density of a non-image area (Dmin) on the thermal recording material, reaches 3.0 or more can be determined by the manufacturer of the thermal recording material in advance of use by a user. The user of the thermal recording material can then optimize the dose of infrared laser radiation by adjusting it so that the predetermined visible light transmission density can be obtained. In this technique, as the dose of infrared laser radiation increases, the visible light transmission density needs to be significantly increased along with an increase in the UV transmission density. A thermal recording material for which the dose of infrared laser radiation can be optimized by measuring the visible light transmission density in accordance with the invention is defined as a thermal recording material that satisfies the following: the difference between the visible light transmission density at a laser power of 240 mW and that at a laser power of 200 mW is 0.1 or more, the difference between the visible light transmission density at a laser power of 300 mW and that at a laser power of 240 mW is 0.1 or more, and the difference between the visible light transmission density at a laser power of 400 mW and that at laser power of 300 mW is 0.2 or more.

TABLE 4

| | | UV transmission density | | | | |
|---|---|---|---|---|---|---|
| | Dmax − Dmin | Non-image area | 200 mW | 240 mW | 300 mW | 400 mW |
| Example 31 | 3.40 | 0.24 | 1.71 | 3.05 | 3.58 | 3.64 |
| Example 32 | 3.53 | 0.23 | 1.82 | 3.10 | 3.75 | 3.72 |
| Example 33 | 3.59 | 0.22 | 1.83 | 3.12 | 3.74 | 3.81 |
| Example 34 | 3.57 | 0.23 | 1.88 | 3.29 | 3.80 | 3.68 |
| Example 35 | 3.51 | 0.23 | 1.81 | 3.21 | 3.74 | 3.74 |
| Example 36 | 3.54 | 0.23 | 1.59 | 3.05 | 3.58 | 3.67 |
| Example 37 | 3.50 | 0.24 | 1.77 | 3.18 | 3.74 | 3.73 |
| Example 38 | 3.43 | 0.22 | 1.69 | 3.11 | 3.61 | 3.65 |
| Example 39 | 3.39 | 0.22 | 1.66 | 3.08 | 3.61 | 3.60 |
| Example 40 | 3.41 | 0.23 | 1.75 | 3.20 | 3.54 | 3.63 |
| Comparative Example 16 | 3.56 | 0.22 | 1.97 | 3.38 | 3.78 | 3.69 |
| Comparative Example 17 | 2.90 | 0.55 | 1.54 | 2.94 | 3.38 | 3.45 |
| Comparative Example 18 | 2.96 | 0.51 | 1.49 | 2.89 | 3.36 | 3.47 |
| Comparative Example 19 | 2.83 | 0.67 | 1.51 | 3.01 | 3.43 | 3.50 |
| Comparative Example 20 | 3.49 | 0.23 | 1.64 | 3.10 | 3.56 | 3.72 |

TABLE 5

| | Visible light transmission density | | | | | Difference between visible light transmission densities | | |
|---|---|---|---|---|---|---|---|---|
| | Non-image area | 200 mW | 240 mW | 300 mW | 400 mW | Between at 240 mW and at 200 mW | Between at 300 mW and at 240 mW | Between at 400 mW and at 300 mW |
| Example 31 | 0.31 | 1.75 | 2.06 | 2.67 | 3.52 | 0.31 | 0.60 | 0.85 |
| Example 32 | 0.30 | 1.61 | 2.20 | 3.08 | 3.95 | 0.59 | 0.88 | 0.87 |
| Example 33 | 0.29 | 1.73 | 2.11 | 2.54 | 3.31 | 0.38 | 0.43 | 0.77 |
| Example 34 | 0.30 | 1.65 | 1.81 | 2.32 | 2.95 | 0.16 | 0.51 | 0.63 |
| Example 35 | 0.29 | 1.60 | 1.92 | 2.47 | 3.11 | 0.32 | 0.55 | 0.64 |
| Example 36 | 0.31 | 1.45 | 1.61 | 1.72 | 2.05 | 0.16 | 0.11 | 0.33 |
| Example 37 | 0.31 | 1.54 | 1.71 | 1.95 | 2.51 | 0.17 | 0.24 | 0.56 |
| Example 38 | 0.30 | 1.48 | 1.65 | 1.81 | 2.11 | 0.17 | 0.16 | 0.30 |
| Example 39 | 0.29 | 1.50 | 1.61 | 1.74 | 1.95 | 0.11 | 0.13 | 0.21 |
| Example 40 | 0.29 | 1.52 | 2.09 | 2.76 | 3.82 | 0.57 | 0.67 | 1.06 |

TABLE 5-continued

| | Visible light transmission density | | | | | Difference between visible light transmission densities | | |
|---|---|---|---|---|---|---|---|---|
| | | | | | | Between | Between | Between |
| | Non-image area | 200 mW | 240 mW | 300 mW | 400 mW | at 240 mW and at 200 mW | at 300 mW and at 240 mW | at 400 mW and at 300 mW |
| Comparative Example 16 | 0.26 | 1.84 | 1.85 | 1.89 | 2.26 | 0.01 | 0.04 | 0.37 |
| Comparative Example 17 | 0.58 | 1.97 | 2.03 | 2.06 | 2.41 | 0.06 | 0.03 | 0.35 |
| Comparative Example 18 | 0.54 | 1.28 | 1.50 | 1.81 | 2.33 | 0.22 | 0.31 | 0.52 |
| Comparative Example 19 | 0.71 | 1.14 | 1.84 | 2.89 | 4.25 | 0.70 | 1.05 | 1.36 |
| Comparative Example 20 | 0.28 | 1.82 | 1.82 | 1.89 | 2.31 | 0 | 0.07 | 0.42 |

The results shown in Tables 4 and 5 demonstrate that on the thermal recording materials of Examples 31 to 40, high contrast images having a Dmax−Dmin value of 3.00 or more can be formed by exposure to infrared laser radiation. The results shown in Table 5 demonstrate that the dose of infrared laser radiation for the thermal recording materials can be optimized by measuring the visible light transmission density of an image area.

On the contrary, the thermal recording material of Comparative Example 16 produced without addition of a compound selected from the group of the compounds represented by the general formulas (1) to (4) to the coating liquid for forming the thermal recording layer demonstrates almost no increase in the visible light transmission density of the image areas even when the dose of infrared laser radiation was increased (especially at a laser power of 300 mW or less).

The thermal recording material of Comparative Example 17 produced with addition of maleic acid to the coating liquid for forming the thermal recording layer instead of addition of a compound selected from the group of compounds represented by the general formulas (1) to (4) shows a high visible light transmission density in the non-image area and demonstrates almost no increase in the visible light transmission density of the image areas even when the dose of infrared laser radiation was increased (especially at a laser power of 300 mW or less).

The thermal recording materials of Comparative Examples 18 and 19 produced with addition of phthalic acid and malonic acid, respectively, to the coating liquid for forming the thermal recording layer instead of addition of a compound selected from the group of compounds represented by the general formulas (1) to (4) shows a high visible light transmission density in the non-image area.

The thermal recording material of Comparative Example 20 produced with addition of sebacic acid to the coating liquid for forming the thermal recording layer instead of addition of a compound selected from the group of the compounds represented by the general formulas (1) to (4) demonstrates almost no increase in the visible light transmission density of the image areas even when the dose of infrared laser radiation was increased (especially at a laser power of 300 mW or less).

The invention claimed is:

1. A thermal recording material, comprising:

a light-transmittable support having thereon an infrared absorbing layer, a thermal recording layer and a protective layer in the order named;

the infrared absorbing layer comprising at least one infrared absorbing dye selected from the group consisting of

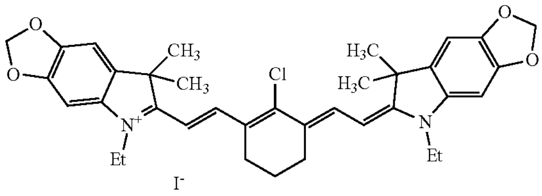

and

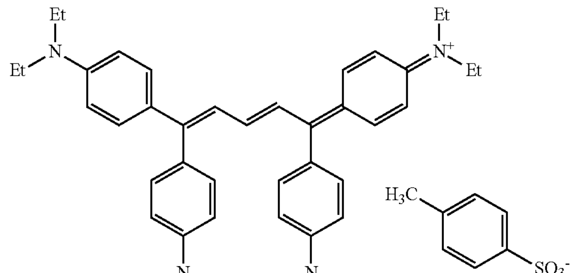

the thermal recording layer comprising a reducing agent, a light-insensitive organic silver salt and being substantially free of any light-sensitive silver halide; and the protective layer comprising hydrophilic particles and a hydrophobic resin, and having a thickness of 2.7 to 8.1 μm, wherein the infrared absorbing dye has a ratio (ε (830)/ε (365)) of at least 6.2, where ε (830) and ε (365) are respectively molar absorption coefficients of the infrared absorbing dye at 830 and 365 nm.

2. The thermal recording material according to claim 1, wherein the infrared absorbing layer further comprises a reducing agent.

3. The thermal recording material according to claim 1, wherein the thermal recording layer further comprises at least one compound represented by formulae (1) to (4)
(1)
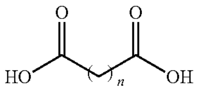
(2)
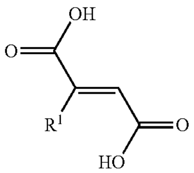
-continued
(3)
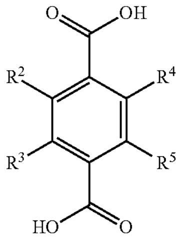
(4)
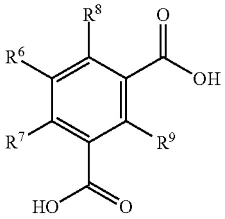
where n represents an integer of 2 to 7, $R^1$ represents a hydrogen atom or a methyl group, and $R^2$ to $R^9$ individually represent a hydrogen atom, a methyl group or a methoxy group.
* * * * *